United States Patent
Otterson et al.

[11] Patent Number: 5,956,634
[45] Date of Patent: Sep. 21, 1999

[54] SYSTEM AND METHOD FOR DETECTION OF FRAUD IN A WIRELESS TELEPHONE SYSTEM

[75] Inventors: Scott D. Otterson, Seattle; Dmitry Kaplan, Bellevue, both of Wash.

[73] Assignee: Cellular Technical Services Company, Inc., Seattle, Wash.

[21] Appl. No.: 08/807,794

[22] Filed: Feb. 28, 1997

[51] Int. Cl.[6] .................................................. H04B 1/00
[52] U.S. Cl. ............................................ 455/410; 455/411
[58] Field of Search .................................... 455/410, 411, 455/418, 423, 424, 425; 380/23, 25; 379/189; 340/825.34; 706/52, 900; 395/726

[56] References Cited

U.S. PATENT DOCUMENTS

| | | | |
|---|---|---|---|
| 4,800,387 | 1/1989 | Joy | 342/165 |
| 4,843,562 | 6/1989 | Kenyon et al. | 364/487 |
| 4,955,049 | 9/1990 | Ghisler | 379/58 |
| 5,005,210 | 4/1991 | Ferrell | 455/115 |
| 5,091,942 | 2/1992 | Dent | 380/46 |
| 5,222,140 | 6/1993 | Beller et al. | 380/30 |
| 5,237,612 | 8/1993 | Raith | 380/23 |
| 5,239,294 | 8/1993 | Flanders et al. | 340/825.34 |
| 5,241,598 | 8/1993 | Raith | 380/21 |
| 5,282,250 | 1/1994 | Dent et al. | 380/23 |
| 5,299,263 | 3/1994 | Beller et al. | 380/30 |
| 5,303,285 | 4/1994 | Kerihuel et al. | 379/58 |
| 5,309,501 | 5/1994 | Kozik et al. | 379/58 |
| 5,315,636 | 5/1994 | Patel | 379/58 |
| 5,319,699 | 6/1994 | Kerihuel et al. | 379/58 |
| 5,329,591 | 7/1994 | Magrill | 380/25 |
| 5,335,265 | 8/1994 | Cooper et al. | 379/59 |
| 5,335,278 | 8/1994 | Matchett et al. | 380/23 |
| 5,345,595 | 9/1994 | Johnson et al. | 455/33.1 |
| 5,375,244 | 12/1994 | McNair | 395/726 |
| 5,390,245 | 2/1995 | Dent et al. | 380/23 |
| 5,392,355 | 2/1995 | Khurana et al. | 380/23 |
| 5,392,356 | 2/1995 | Konno et al. | 380/23 |
| 5,420,908 | 5/1995 | Hodges et al. | 379/58 |
| 5,420,910 | 5/1995 | Rudokas et al. | 379/59 |
| 5,448,760 | 9/1995 | Frederick | 455/56.1 |
| 5,455,863 | 10/1995 | Brown et al. | 380/23 |
| 5,465,387 | 11/1995 | Mukherjee | 455/26.1 |
| 5,467,382 | 11/1995 | Schorman | 379/58 |
| 5,488,649 | 1/1996 | Schellinger | 379/62 |
| 5,509,075 | 4/1996 | Grube et al. | 380/23 |
| 5,517,554 | 5/1996 | Mitchell et al. | 379/59 |

(List continued on next page.)

*Primary Examiner*—Reinhard J. Eisenzopf
*Assistant Examiner*—Makoto Aoki
*Attorney, Agent, or Firm*—Seed and Berry LLP; Michael J. Donohue

[57] ABSTRACT

A system and method for combining the results of different analysis portions to produce a single YES/NO decision regarding the validity of a present cellular telephone call. A soft data analysis portion of the system analyzes soft data, such as the results of a signature analyzer and a customer call profile and determines the likelihood that the particular call is a valid call from an authorized cellular telephone or an invalid call from a fraudulent cellular telephone. In addition, the system performs a deterministic analysis of the particular phone call to independently designate the particular phone call as valid or invalid. The outputs from the deterministic analyzer and the soft data analyzer portion are combined in a combinatorial logic circuit to produce a single binary output having one logic level for valid calls from the authorized cellular telephone and the opposite logic level for invalid calls from the fraudulent cellular telephone. In addition, the deterministic analyzer may include a control line to override the decision of the soft analyzer to permit calls to designated numbers, such as emergency numbers, even if the independent analysis indicates that the particular call is invalid. In one embodiment, the soft data analyzer portion is a fuzzy logic classifier receiving data inputs and confidence values from the various soft data portions of the system. The fuzzy logic classifier combines the various soft data inputs to produce a single binary output. A sensitivity input is used to vary the threshold of the binary output. The binary output of the fuzzy logic analyzer is combined with the outputs of the deterministic analyzer by the combinatorial logic circuit.

43 Claims, 11 Drawing Sheets

U.S. PATENT DOCUMENTS

| | | | |
|---|---|---|---|
| 5,517,555 | 5/1996 | Amadon et al. | 379/59 |
| 5,517,568 | 5/1996 | Grube et al. | 380/23 |
| 5,535,431 | 7/1996 | Grube et al. | 455/54.1 |
| 5,537,474 | 7/1996 | Brown et al. | 380/23 |
| 5,541,977 | 7/1996 | Hodges et al. | 379/58 |
| 5,548,636 | 8/1996 | Bannister et al. | 379/201 |
| 5,551,073 | 8/1996 | Sammarco | 455/89 |
| 5,555,192 | 9/1996 | Grube et al. | 364/514 R |
| 5,555,551 | 9/1996 | Rudokas et al. | 379/59 |
| 5,557,654 | 9/1996 | Mäenpää | 379/58 |
| 5,615,408 | 3/1997 | Johnson et al. | 455/33.1 |
| 5,625,869 | 4/1997 | Nagamatsu et al. | 455/33.1 |
| 5,633,914 | 5/1997 | Rosa | 379/59 |
| 5,655,004 | 8/1997 | Holbrook | 455/411 |
| 5,713,072 | 1/1998 | Marth et al. | 455/33.1 |
| 5,715,518 | 2/1998 | Barrere et al. | 455/49.1 |
| 5,748,722 | 5/1998 | Lee | 379/160 |
| 5,748,742 | 5/1998 | Tisdale et al. | 455/410 |
| 5,758,277 | 5/1998 | Hawkes | 455/410 |
| 5,770,846 | 6/1998 | Mos et al. | 1235/440 |
| 5,777,558 | 7/1998 | Pennypacker et al. | 340/635 |
| 5,790,645 | 8/1998 | Fawcett et al. | 379/189 |
| 5,805,674 | 9/1998 | Anderson, Jr. | 379/93.03 |

SYSTEM AND METHOD FOR DETECTION OF FRAUD IN A WIRELESS TELEPHONE SYSTEM

TECHNICAL FIELD

The present invention relates generally to cellular telephone operation, and, more particularly, to a system and method for the detection of fraud in a cellular telephone system.

BACKGROUND OF THE INVENTION

In a communications network, it is often desirable to identify and distinguish one transmitter from other transmitters operating within the network. For example, in the radio telephone industry, a cellular telephone system utilizes an electronic serial number (ESN) and a mobile telephone identification number (MIN) to provide a unique identification for each transmitter. When an individual subscriber or other authorized user of a particular cellular telephone wishes to place a phone call, he dials in a telephone number and presses the "Send"button. In response, his cellular telephone transmits its ESN and MIN to the cellular network so that the individual subscriber can be charged for the telephone call.

Cellular telephones provide a great advantage over fixed telephones because the user has almost unlimited mobility. A user subscribes to a cellular service in one location, such as his home or office, but can use the cellular telephone in other locations as well. If the user operates the cellular telephone to place or receive call outside the area of coverage of the cellular telephone network to which he has subscribed, the cellular telephone operates in a "Roam" mode. Cellular telephone networks are in place in most areas of the United States and in many areas throughout the world. The user can operate the cellular telephone in the Roam mode to place a telephone call from virtually any location in the world that has cellular network coverage. Similarly, the user can receive a call from a fixed telephone location or any other cellular telephone whether the user is in the area of coverage of the cellular telephone network to which he has subscribed or is roaming in another area. This form of communication thus offers a great deal of freedom for the user and those communicating with the user.

Unfortunately, unscrupulous individuals illegally operate cellular telephones by counterfeiting the ESN and MIN of a valid subscriber's telephone in order to obtain illegal access to the cellular network without paying for the service. The ESN and MIN of a cellular telephone can be obtained by a counterfeiter electronically monitoring the initial transmission of the user's telephone, and then programming the detected ESN and MIN into another telephone for illegal use. Thus, the mere transmission of the authentic ESN and MIN is by itself inadequate to protect a cellular telephone system from misuse by counterfeiters.

While the cellular telephone is identified by its ESN and MIN, it cannot be considered as an authorized cellular telephone because it is not known whether the ESN and MIN have been transmitted by the authorized cellular telephone or a fraudulent cellular telephone. For purposes of the present description, a cellular telephone identified on the basis of the transmitted ESN and MIN is designated as an unauthenticated cellular telephone until it is determined to be an authorized cellular telephone or a fraudulent cellular telephone. The designation of the unauthenticated cellular telephone as authorized or fraudulent must be made on the basis of some form of analysis beyond a simple check of the ESN and MIN to see that these are valid numbers.

In an effort to provide additional security, some cellular systems and other wireless services, authenticate mobile units based on the radio frequency (RF) transmission of data by the mobile unit during a call set-up process. Rather than identify the mobile unit by its ESN and MIN alone, the system identifies a cellular telephone by its transmission characteristics. In this manner, the cellular system operator can reject calls from illegitimate cellular telephones even when those cellular telephones transmit valid ESN and MIN numbers. For example, in U.S. Pat. No. 5,005,210 issued to Ferrell on Apr. 2, 1991 ("the Ferrell patent"), a system is described that analyzes certain transmitter characteristics in an effort to identify the transmitter type. The system in the Ferrell patent analyzes the manner in which the modulator makes a transition to the designated carrier frequency. This transient response is used to identify the type of transmitter.

While the Ferrell patent describes one class of transmission characteristics that can be used as a fingerprint, other transmission characteristics are also known in the art. For example, U.S. Pat. No. 5,420,910 issued to Rudokas et al. on May 30, 1995 ("the Rudokas patent"), describes an identifier, such as a radio frequency signature, that can be used to positively identify an authorized cellular telephone or a fraudulent cellular telephone. Other types of signature authentication systems are also known in the art and need not be described herein. These transmission characteristics, from whatever source they are derived, can be processed in different manners to create a "fingerprint" of the individual transmitter. The analogy with fingerprints is used because each transmitter fingerprint is believed to be completely unique. The transmitter fingerprint can be used to determine whether the transmission characteristics of the unauthenticated transmitter match the stored fingerprint of the authorized transmitter corresponding to the transmitted ESN and MIN. In such manner, the fingerprint is used with cellular telephone calls to authenticate a cellular telephone.

For purposes of the present description, a present call being analyzed is designated as a valid cellular telephone call from an authorized cellular telephone or an invalid call from a fraudulent cellular telephone. The process of comparing the transmission characteristic of the unauthenticated transmitter from the present call with the stored fingerprint must be performed in real-time to effectively deny or terminate invalid calls. Unfortunately, no fingerprint analysis system is 100% effective. The transmission characteristic rarely, if ever, precisely matches the stored fingerprint. Thus, it is possible that a fraudulent cellular telephone will be identified as an authorized cellular telephone. Conversely, it is possible that an authorized cellular telephone will be identified as fraudulent. While the former misidentification may result in incorrect charges to the customer, and the resulting loss of revenues to the service provider, the latter misidentification results in great inconvenience to the customer and the disruption of valid calls due to the misidentification of an authorized cellular telephone as fraudulent.

Some existing cellular telephone systems use other analysis techniques to classify cellular telephones as authorized or fraudulent. Many of these analysis techniques cannot be performed in real-time. For example, some cellular telephone service providers identify certain destination telephone numbers as "known fraudulent numbers" and will not permit cellular telephone calls to be placed to those numbers. However, the use of a known fraudulent numbers list will not aid in terminating the first fraudulent cellular telephone call to that number. A particular cellular telephone call can subsequently be designated as invalid based on factors such as customer complaints about the bill. In this case, the destination telephone number called by the fraudulent cellular telephone is added to the list of known fraudulent numbers. The cellular telephone system checks the list of known fraudulent numbers to prevent any subsequent telephone calls from being placed to a known fraudulent number.

Some cellular telephone service providers are forced to adopt extreme measures to reduce the illegal use of cellular telephones. For example, in geographic areas known to be inundated with illegal users, some cellular telephone service providers will not allow cellular telephones to operate in the Roam mode. Unfortunately, this form of fraud prevention comes at the cost of great inconvenience to the legitimate user who may not be able to enjoy the full freedom of mobility offered by cellular telephone technology.

Each type of detection technique described above offers some degree of protection against fraudulent cellular telephone use. However, each detection technique suffers from disadvantages in either it ability to detect fraudulent use, the processing time required to detect fraudulent use, or in the burden imposed on cellular telephone customers by limiting their ability to use their cellular telephone or by making it less convenient to do so.

Therefore, it can be appreciated that there is a significant need for a system and method for detection of wireless telephone fraud and that has the advantages of different fraud detection techniques, but minimizes the inconvenience to the customer. The present invention provides this and other advantages as will be illustrated by the following description and accompanying figures.

SUMMARY OF THE INVENTION

The present invention is embodied in a system and method for the authorization of telephone communications with an unauthenticated wireless telephone in a wireless telephone system. The system utilizes soft data generated by analysis of characteristics of the unauthenticated wireless telephone with respect to stored characteristics associated with an authorized wireless telephone. In addition, the system uses deterministic data generated by an analysis of characteristics of the present communication.

The system includes a first analyzer to receive and analyze soft data to determine a likelihood that the present communication is a valid communication with the authorized wireless telephone or an invalid communication with a fraudulent wireless telephone. The first analyzer generates a first authorization signal at a first binary level if the analysis determines that the present communication is the valid communication and at a second binary level, different from the first binary level, if the analysis determines that the present communication is an invalid communication. A second analyzer receives and analyzes deterministic data to determine if the present communication with the unauthenticated wireless telephone is the valid communication or the invalid communication. The second analyzer generates a second authorization signal at a third binary level if the second analyzer determines that the present communication is the valid communication and a fourth binary level, different from the third binary level, if the second analyzer determines that the present communication is the invalid communication. The system also includes a combinatorial logic unit to combine the first and second authorization signals and generate an output signal at a fifth binary level to authorize the present communication only if the first and second authorization signals are both at the first and third binary levels, respectively, and generating the output signal at a sixth binary level, different from the fifth binary level, if either of the first and second authorization signals is at the second and fourth binary levels, respectively.

The first analyzer may be a soft analyzer or neural network analyzer that combines soft data generated by the analysis telephone communication and the unauthenticated wireless telephone. The first analyzer may also be a fuzzy logic classifier that applies a predetermined set of logic rules to the soft data generated by the analysis of characteristics of the telephone communication and the unauthenticated wireless telephone.

The system may also include a signature analyzer to generate soft data by classifying the unauthenticated wireless telephone as the authorized wireless telephone or the fraudulent wireless telephone based on analysis of a transmission characteristic of the unauthenticated wireless telephone detected during the present communication with the unauthenticated wireless telephone. The signature analyzer calculates a first data value indicative of a degree of similarity between the transmission characteristic of the unauthenticated wireless telephone and a stored reference characteristic. The first analyzer generates the first authorization signal based at least in part on the first data value generated by the signature analyzer. The signature analyzer may also analyze a plurality of different transmission characteristics.

The signature analyzer may also calculate confidence values for the data values indicative of a statistical measure of reliability of each of the data values. The first analyzer uses the confidence values as weighting factors for the data values. If the first analyzer is a fuzzy logic classifier, the confidence values may be used as additional data values when applying the predetermined set of rules.

The system may include the results of analysis of previous communications with the unauthenticated wireless telephone prior to the present communication. If previous communications have been determined by the first analyzer to be invalid based on the classification by the signature analyzer, a data parameter associated with each of the plurality of previous communications is stored in a data storage location. The second analyzer will generate the second authorization signal at the fourth binary level whenever the second analyzer determines that a corresponding data parameter associated with the present communication matches one of the stored data parameters.

In one embodiment, the second analyzer always generates the second authorization signal at the third binary level unless the second analyzer determines that the present communication is the invalid communication.

The system may also include a storage area containing a list of known fraudulent destination telephone numbers. The present communication includes a plurality of dialed digits indicative of an intended destination telephone number. The second analyzer will generate the second authorization signal at the fourth binary level whenever the second analyzer determines that the dialed digits of the present communication matches one of the known fraudulent destination telephone numbers.

The second analyzer may also generate a third authorization signal at a seventh binary level if determined that the present communication should be processed regardless of the first and second authorization signals. The combinatorial logic unit combines the first, second, and third authorization signals and generates the output signal at the fifth binary level regardless of the first and second authorization signals if the third authorization signal is at the seventh binary level. The combinatorial logic unit generates the output signal at the sixth binary level if the third authorization signal is at an eight binary level, different from the seventh binary level, and one of the first and second output signals are at the second and fourth binary levels, respectively. The system may include a data storage area containing a predetermined telephone number. The second analyzer generates the third authorization signal at the seventh binary level if determined that the dialed digits of the present communication matches the stored predetermined telephone number. For example, the stored predetermined telephone number may correspond to an emergency telephone number. The second analyzer generates the third authorization signal at the seventh binary level if the dialed digits of the present communication matches the stored emergency telephone number.

DETAILED DESCRIPTION OF THE INVENTION

Figure 1A:
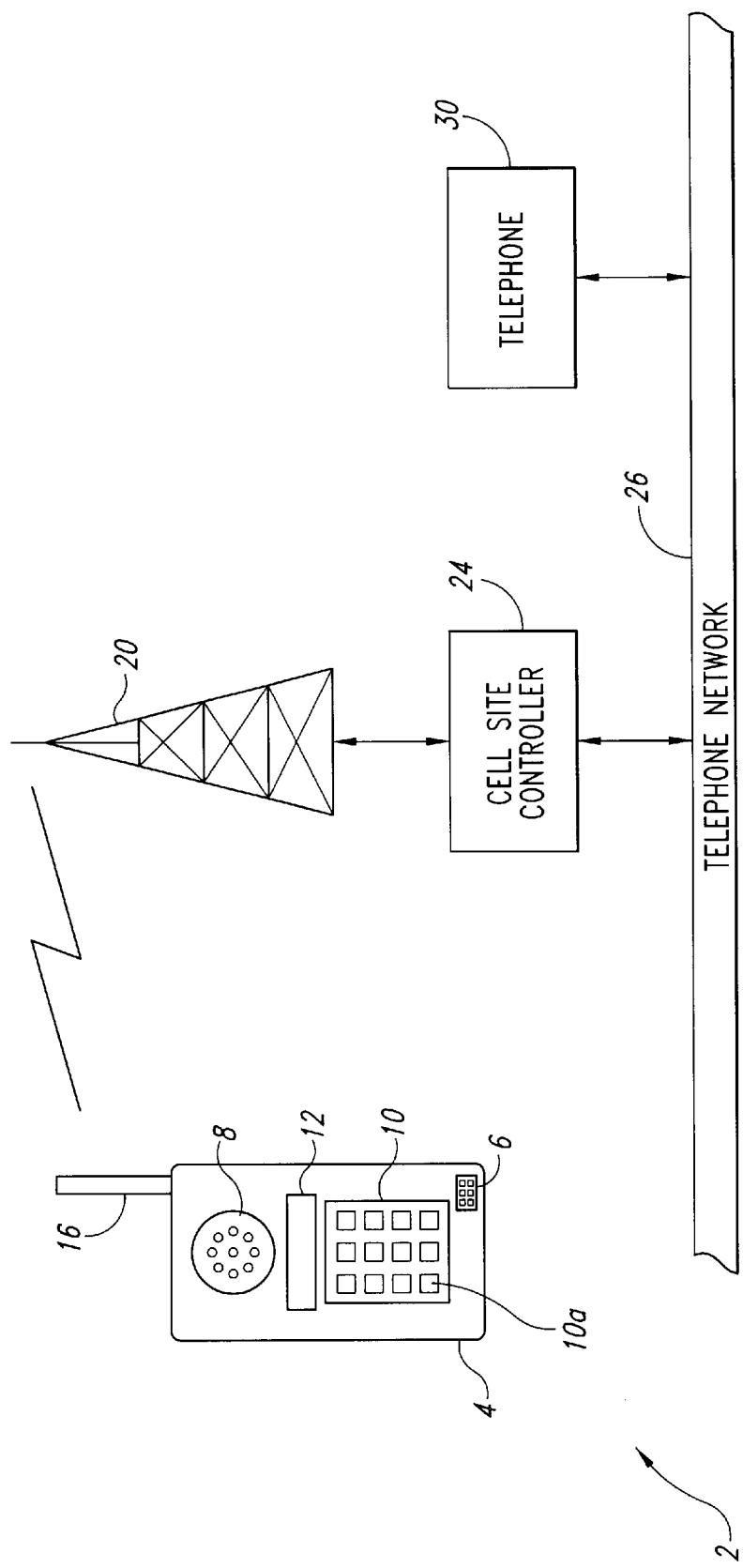
FIG. 1A illustrates the operation of a conventional cellular telephone system.

For a more complete understanding of the present invention, the operation of a wireless telephone system will be briefly discussed. Although the discussion that follows is directed to cellular telephones, it should be clearly understood that the invention can be used with wireless telephone devices that may transmit voice such as cellular telephones or data such as data modems. The term telephone as used herein is intended to include devices for wireless voice and data communication. A conventional cellular telephone system 2 is illustrated in FIG. 1A. An individual cellular telephone 4 has a microphone 6 and a speaker 8, as well as a keypad 10 and a display 12. The keypad 10 typically includes a redial button 10a that automatically redials the last called number when depressed by the user.

Transmitter and receiver circuits (see FIG. 2) within the cellular telephone 4 communicate via an antenna 16 to a cell site antenna 20 at a frequency typically in the 800 megahertz (MHz) frequency range. The signal received by the cell site antenna 20 is coupled to a cell site controller 24. The conventional cell site controller 24 verifies the authenticity of the ESN and MIN transmitted by the cellular telephone 4 at the beginning of a cellular telephone call, as well as the telephone number being called by the cellular telephone 4. The digits of the telephone number to which a cellular telephone call is placed are designated herein as "dialed digits."

The cell site controller 24 couples the cellular telephone 4 to a conventional telephone network 26. Also coupled to the telephone network 26 is a telephone 30 to which the cellular telephone 4 is placing a call. In this manner, the cellular telephone 4 can communicate with the telephone 30. Similarly, the telephone 30 may place a call to the cellular telephone 4 in the reverse manner described above. The telephone 30 is illustrated in FIG. 1A as connected directly to the telephone network 26. However, those skilled in the art will recognize that the telephone 30 could be another cellular telephone coupled to the cell site controller 24 by the cell site antenna 20, or another cell site controller and antenna (not shown).

Figure 1B:
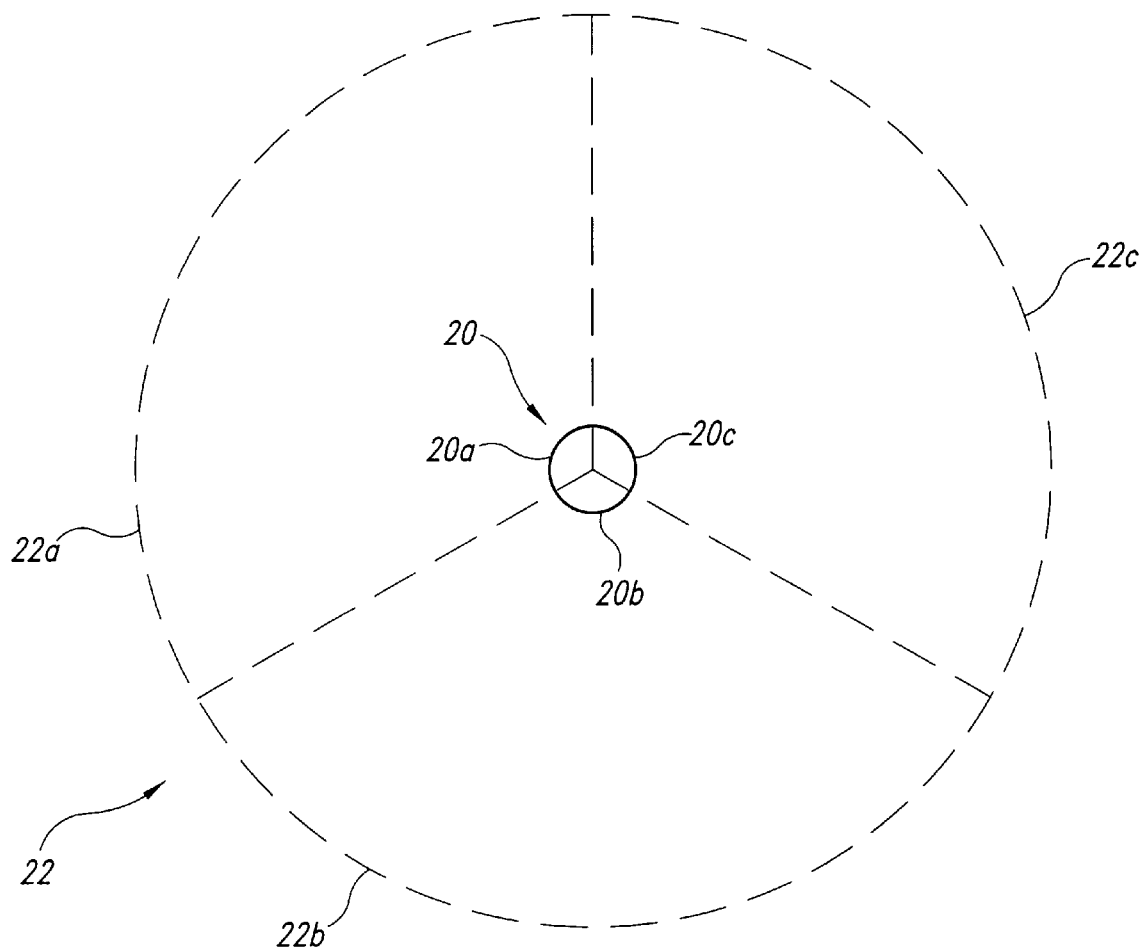
FIG. 1B is a top plan view illustrating sectors of coverage in the conventional cellular telephone system of FIG. 1A.

The antenna 20 has a field of coverage, designated as a cell 22, as shown in FIG. 1B. The antenna 20 is divided into three antenna portions 20a, 20b, and 20c, with each antenna portion providing coverage over a sector 22a, 22b, and 22c, respectively, of the cell 22. Those of ordinary skill in the art will recognize that the cell 22 may have more or less sectors than the three sectors 22a to 22c illustrated in FIG. 1B. The cell 22 is illustrated with the antenna 20 located at the center of a substantially circular area of coverage with each sector 22a to 22c being approximately one-third of the cell. However, those of ordinary skill in the art will recognize that the actual area of coverage in the sectors 22a to 22c and the cell 22 varies in shape and size depending on many factors such as the location of the antenna, the transmission power of the transmitter (not shown) in the cell, geographic features, and the like.

Figure 2:
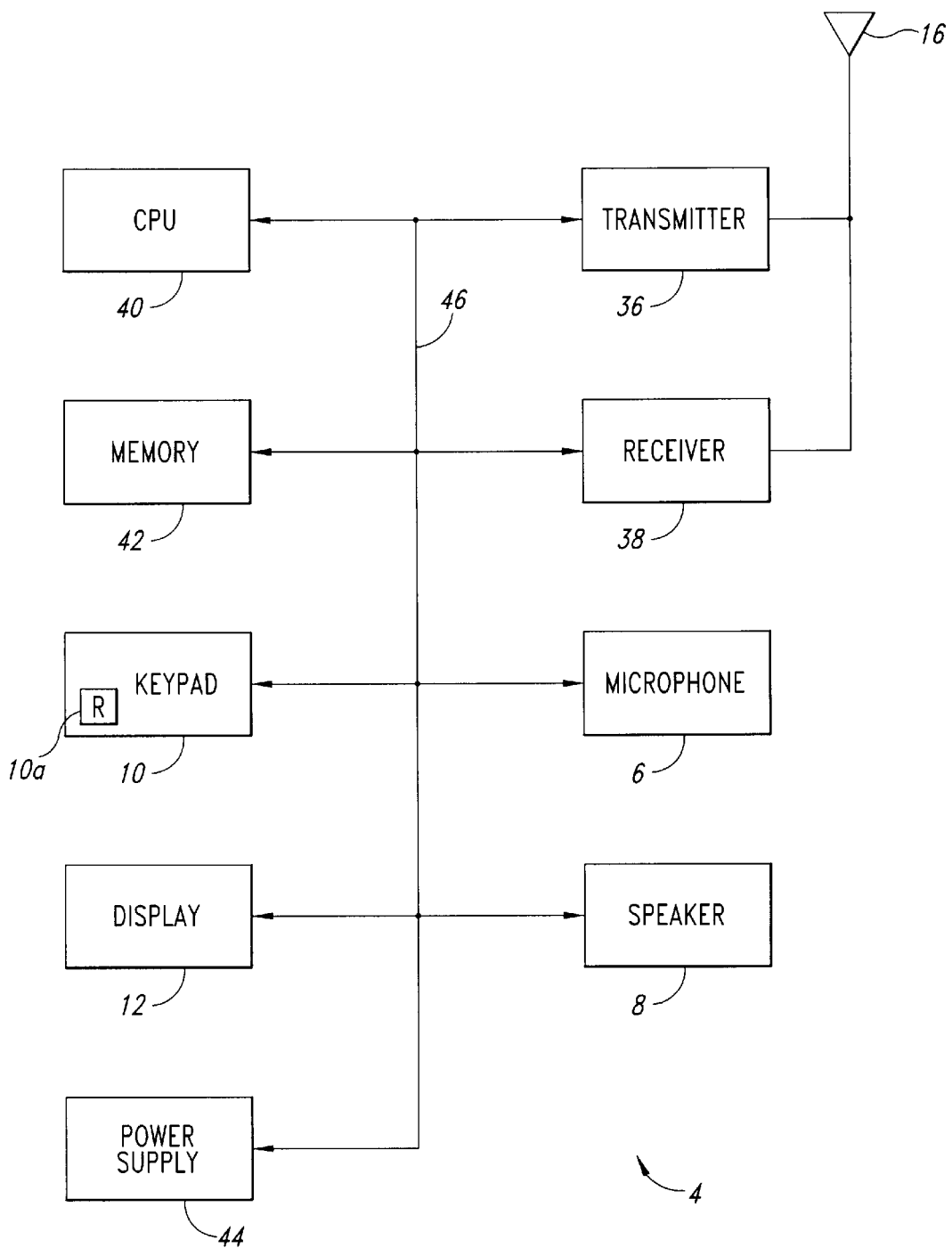
FIG. 2 is a functional block diagram of a conventional cellular telephone used with the conventional cellular telephone system of FIG. 1A.

The conventional cellular telephone 4 is illustrated in the functional block diagram of FIG. 2. The antenna 16 is coupled to a transmitter 36 and a receiver 38. The microphone 6, speaker 8, keypad 10, and display 12 are conventional components that need not be described in any greater detail. The cellular telephone 4 also includes a central processing unit (CPU) 40, which may be an embedded controller, conventional microprocessor, or the like. In addition, the cellular telephone 4 includes a memory 42, which may include both random access memory (RAM) and read-only memory (ROM). The cellular telephone 4 also includes a power supply 44, which includes a battery (not shown) for internal power and a power supply connector (not shown). For the sake of clarity, other conventional components, such as the modulator, demodulator, and local oscillator have been omitted. The various components described above are coupled together by a bus 46. For the sake of clarity, the bus 46 is illustrated as coupling all components together. However, those skilled in the art will recognize that some components, such as the microphone 6 and speaker 8, are analog components while the CPU 40 and memory 42 are digital components. Thus, the bus 46 represents both the analog and digital interconnection of components. The operation of the cellular telephone 4 is well known in the art and thus will only be described in the context of the present invention.

The cellular telephone 4 communicates with the cell site controller 24 (see FIG. 1A) using a control channel having a predetermined frequency for the cell site and a voice channel having a frequency designated by the cell site controller 24 for the particular call being placed. Initial communications between the cellular telephone 4 and the cell site controller 24 occur using only the control channel. The cellular telephone 4 transmits the stored ESN and MIN for the cellular telephone to the cell site controller 24 over the control channel. In addition, the dialed telephone number is also transmitted from the cellular telephone 4 to the cell site controller 24 over the control channel. Digital data using frequency-shift keying (FSK) of 10K baud Manchester-encoded data is transmitted and received over the control channel.

Figure 3:
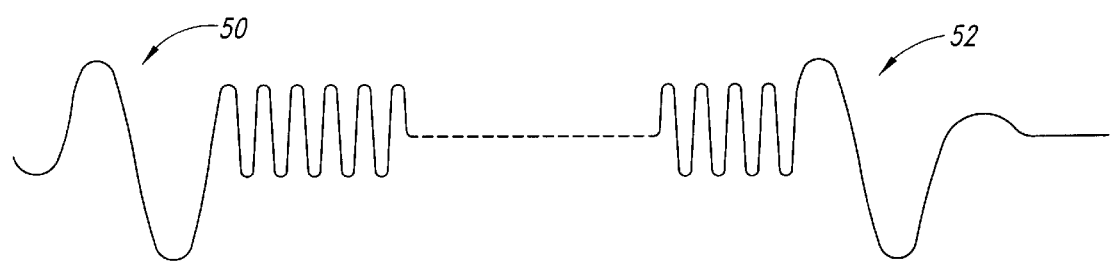
FIG. 3 is a waveform illustrating transmission characteristics of the transmitter of the conventional cellular telephone of FIG. 2.

A typical waveform on the control channel is illustrated in FIG. 3. When the user first presses the "Send" button (not shown) on the keypad 10 (see FIG. 2), the transmitter 36 FSK modulates the data at a predetermined control frequency in the 800 MHz band. When the transmitter 36 is first activated, it must lock onto the appropriate radio frequency (RF) for the particular control channel. The process of locking onto the selected control channel frequency generates a turn-on transient 50. It should be noted that the waveform illustrated in FIG. 3 is not the RF signal itself, but rather an example of the demodulated output received at the cell site controller 24. In addition to the turn-on transient 50, the cellular telephone 4 generates a turn-off transient 52. The turn-off transient 52 results from the turn-off transient response of the transmitter 36 (see FIG. 2) when transmission on the control channel is complete. The turn-on transient 50 and the turn-off transient 52, which are described in the Ferrell patent, are presented herein merely as examples of the transmission characteristics of an individual cellular telephone transmitter 36. Alternatively, the cell site controller 24 can analyze other transmission characteristics such as the transient response of the FSK data. For example, it is known that the transmission characteristics of the cellular telephones made by certain manufacturers have unique transmission characteristics, known as pre-dotting. Pre-dotting is a short series of sinewaves that is present in the transmission of the cellular telephones of a particular manufacturer just before the transmission of the FSK data. The presence of pre-dotting can be used to uniquely identify an unauthenticated cellular telephone as one manufactured by the particular company. Other reference waveforms are illustrated in the Rudokas patent and other references. These reference waveforms, which can be from any source of reference waveforms, are used to generate a fingerprint for the cellular telephone 4. The fingerprint is subsequently used to determine if the cellular telephone making a call is the authorized cellular telephone 4, or an illegal/pirate cellular telephone fraudulently transmitting an authentic ESN and MIN of the cellular telephone 4 of a valid subscriber.

The transmission characteristics, no matter how derived, are received at the cell site controller 24 and compared with a stored fingerprint for the authorized cellular telephone 4. One such system for adaptively comparing waveforms is discussed in U.S. patent application Ser. No. 08/611,429, entitled "Adaptive Waveform Matching For Use In Transmitter Identification," filed on Mar. 6, 1996, which is incorporated herein by reference in its entirety. That system performs a real-time analysis of the transmission characteristic from the unauthenticated transmitter and the stored fingerprint. The stored fingerprint comprises a plurality of individual reference waveforms and a composite mean waveform. An analyzer provides an output indicative of the variance of the transmission characteristic from the composite mean waveform compared to the variance of the individual reference waveforms from the composite mean waveform. The transmission characteristic analysis also provides a confidence value, which is a statistical measure of the degree of match between the transmission characteristic from the unauthenticated transmitter and the stored fingerprint. That system also provides the ability to update the fingerprint and is thus adaptive.

However, other techniques can be used to detect fraudulent use of cellular telephones. For example, the cellular telephone service provider can create a list of known fraudulent numbers, as previously discussed. The list of known fraudulent numbers is created based on customer complaints regarding erroneous past telephone charges. The cellular telephone service provider checks the dialed digits for subsequent calls against the list of known fraudulent numbers and designates any calls to known fraudulent numbers as invalid calls. Thus, the cellular telephone service provider can deny calls based on techniques other than waveform analysis.

A customer call profile is another example of a non-waveform analysis technique used to determine whether the cellular telephone 4 is an authorized cellular telephone or a fraudulent cellular telephone. Such a technique is described in copending U.S. patent application Ser. No. 08/699,773 entitled "System And Method For Detection Of Fraud In A Wireless Telephone System," filed on Jun. 27, 1996, which is incorporated herein by reference in its entirety. In that co-pending application, a customer call profile is established for each authorized cellular telephone 4 by recording the geographic area from which a cellular telephone call was placed, as well as a time period of the day in which the call was placed. If the waveform analysis determines that the cellular telephone 4 is an authorized cellular telephone, the geographic and time data for that particular call may be recorded in the customer call profile. The customer call profile described in the above-referenced patent application can store data entries for up to 256 cellular telephone calls over 20 different geographical regions, such as cell sites. The customer call profile may be used to verify that a subsequent cellular telephone call is being made from the authorized cellular telephone 4. As described in that patent application, a signal is generated indicating that the geographic area and time period of the subsequent cellular telephone call matches one or more entries in the customer call profile. In addition, a confidence value is also calculated to indicate the degree of match between a present cellular telephone call and the customer call profile. For example, a customer may place 90% of his cellular telephone calls from one geographic region and during one time period of the day. If the subsequent telephone call is from the same geographic region and the same time period, there is a relatively high confidence that this call is from the authorized cellular telephone as compared to a subsequent telephone call that occurs in a geographic region from which the customer has never placed a call and during a time period when the customer never or rarely places a call. Thus, the confidence value provides a statistical measure of the degree of match between the location and time data of the subsequent call and the location and time data in the customer call profile.

Each of these different detection techniques exploit different facets of cellular telephone communication and permit the detection of fraudulent cellular telephones as well as the authentication of cellular telephones. Each different technique may be thought of as a "whorl" in a fingerprint. A fingerprint is identified by virtue of detection of matches in certain independent areas of the fingerprint known as whorls that make up the fingerprint. A fingerprint match is said to exist if the fingerprint under analysis matches one or more whorls of a stored fingerprint. The present invention is directed to a system and method for combining cellular telephone whorls to classify the present call as valid or invalid.

The cell site controller 24 (see FIG. 1A) uses this classification to determine whether or not to process the present call. If the present call is designated as a valid call, the cell site controller 24 will process the call (i.e., permit the call to go through) whereas a call that is classified as invalid will not be processed by the cell site controller (i.e., the call will be terminated). A significant difficulty in combining various whorls is that some whorls, such as waveform signature analysis, are imprecise by their very nature. That is, there is not 100% certainty in the data supplied by these portions of the analysis system. These imprecise data are defined herein as probabilistic or soft data. Other forms of data, such as the list of known fraudulent numbers, are very precise. That is, there is 100% certainty in the data supplied by these portions of the analysis system. These precise data are defined herein as deterministic or precise data. The present invention provides a unique solution to the combination of soft data from multiple sources with deterministic data from multiple sources to produce a single output to the cell site controller 24 indicating that the present call is valid or invalid.

Figure 4:
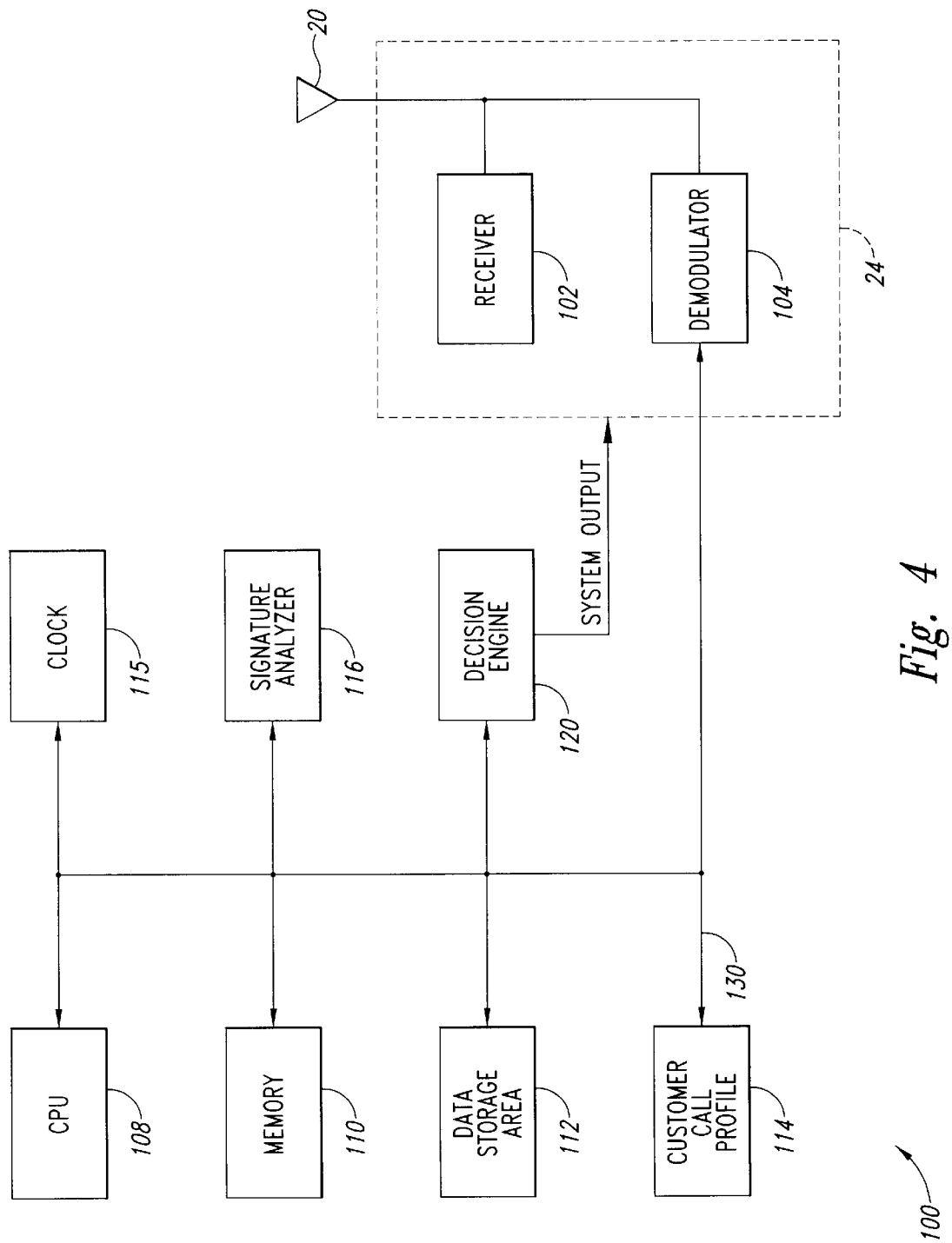
FIG. 4 is a functional block diagram of the system of the present invention.

The present invention is embodied in a system 100 illustrated in the functional block diagram of FIG. 4, and is typically installed at and communicates with the cell site controller 24. The cell site controller 24 includes a receiver 102, coupled to the cell site antenna 20. The signals received by the receiver 102 are coupled to a demodulator 104 within the cell site controller 24 which demodulates the received RF signal and produces FSK data. The system 100 includes a central processing unit (CPU) 108 that processes the received FSK data. Many of the processes described herein are performed by the CPU 108 using conventional programming techniques. The programming techniques are well within the knowledge of those of ordinary skill in the art of computer programming and need not be described in detail herein.

The system 100 also includes a memory 110, which may include both random access memory (RAM) and read-only memory (ROM). A data storage area 112 is used to store data related to a plurality of calls from the authorized cellular telephone 4 and calls to the cellular telephone. The data storage area 112 may be part of the memory 110, or a mass storage unit such as a hard disk drive, tape drive, or the like. The operation of the data storage area 112 will be described in detail below.

A customer call profile 114 stores data related to customer calling patterns. One example of a customer call profile is discussed in the above-identified U.S. Patent Application entitled "System And Method For Detection Of Fraud In A Wireless Telephone System." In one example, a customer call profile is established for calls that have been designated as coming from the authorized cellular telephone 4. However, it should be clear that other forms of call profiling may be used as the customer call profile 114. For example, a customer call profile can be established for calls that have been designated as coming from fraudulent cellular telephones. A subsequent telephone call that corresponds to a fraudulent call profile may be denied by the system 100. The customer call profile 114 may be part of the memory 110, the data storage area 112, or another suitable storage location. A clock 115 is also used by the system 100 to determine the time and date at which data in the customer call profile 114 was obtained from the authorized cellular telephone 4.

The system 100 also includes a signature analyzer 116 that performs a signature analysis of transmission characteristics of the transmitter 36 (see FIG. 2) in the cellular telephone 4. As discussed above, any acceptable signature analysis technique will operate satisfactorily with the system 100. One example of a signature analysis technique is described in the above-identified U.S. Patent Application entitled "Adaptive Waveform Matching For Use In Transmitter Identification." The signature analyzer 116 generates output data to provide a measure of the degree of similarity between the transmission characteristic of the transmitter of the unauthenticated cellular telephone and the stored fingerprint for the cellular telephone corresponding to the ESN/MIN being transmitted by the unauthenticated cellular telephone. The signature analyzer 116 also generates a confidence value indicative of the degree of variation of the transmission characteristic from the unauthenticated transmitter from a mean reference waveform compared to variations of the individual reference waveforms from the mean reference waveform. As will be discussed in greater detail below, confidence values from elements such as the customer call profile 114 and signature analyzer 116 can be used to bias or weight the results of various analysis techniques so that data with higher confidence values have a greater impact than data with lower confidence values. Alternatively, the confidence values can be used as additional output data. However, the scope of the present invention is not limited by the specific technique used to perform the analysis of the transmission characteristics. Rather, the present invention is directed to a technique for combining the results of the signature analyzer 116 and other analysis portions of the system 100.

The soft data, such as output data from the customer call profile 114 and the signature analyzer 116 are provided as inputs to a decision engine 120. As will be described in greater detail below, the decision engine 120 combines the data values and confidence values from the customer call profile 114, the signature analyzer 116 as well as data from other probabilistic portions of the system 100. The decision engine 120 also receives and combines deterministic data, such as known fraudulent numbers in the data storage area 112. Finally, the decision engine 120 combines the soft data and the deterministic data to determine whether the present cellular telephone call should be processed (i.e., the call allowed) by the cell site controller 24 (see FIG. 2) or terminated (i.e., the call denied).

The decision engine 120 combines the various analysis portions of the system 100 to generate a system output 122. The system output 122 is a binary level output signal that is coupled to the cell site controller 24 to provide the cell site controller with a "YES/NO" decision for each call based on a combination of factors described below. The system 100 operates in real-time to analyze each call for the cell site controller 24.

A high logic level at the system output 122 of the decision engine 120 is generated if the decision engine determines that the present call should be processed by the cell site controller 24 (i.e., the call allowed). A low logic level for the system output 122 indicates that the decision engine 120 has determined that the present call should be terminated by the cell site controller 24 (i.e., the call denied).

The various components of the system 100 are coupled together by a bus system 130, which may carry control signals and power in addition to data. Other components of the system 100 and cell site controller 24, such as a power supply, transmitter, telephone switching network, and the like are conventional components that form no part of the present invention. For the sake of brevity, those conventional components of the cell site controller 24 are omitted from the present description. It should be noted that many of the elements in FIG. 4, such as the signature analyzer 116 and the decision engine 120, may comprise a series of computer instructions executed by the CPU 108. However, for the sake of clarity, these functions are illustrated in FIG. 4 as separate blocks because each performs a distinct task.

Figure 5:
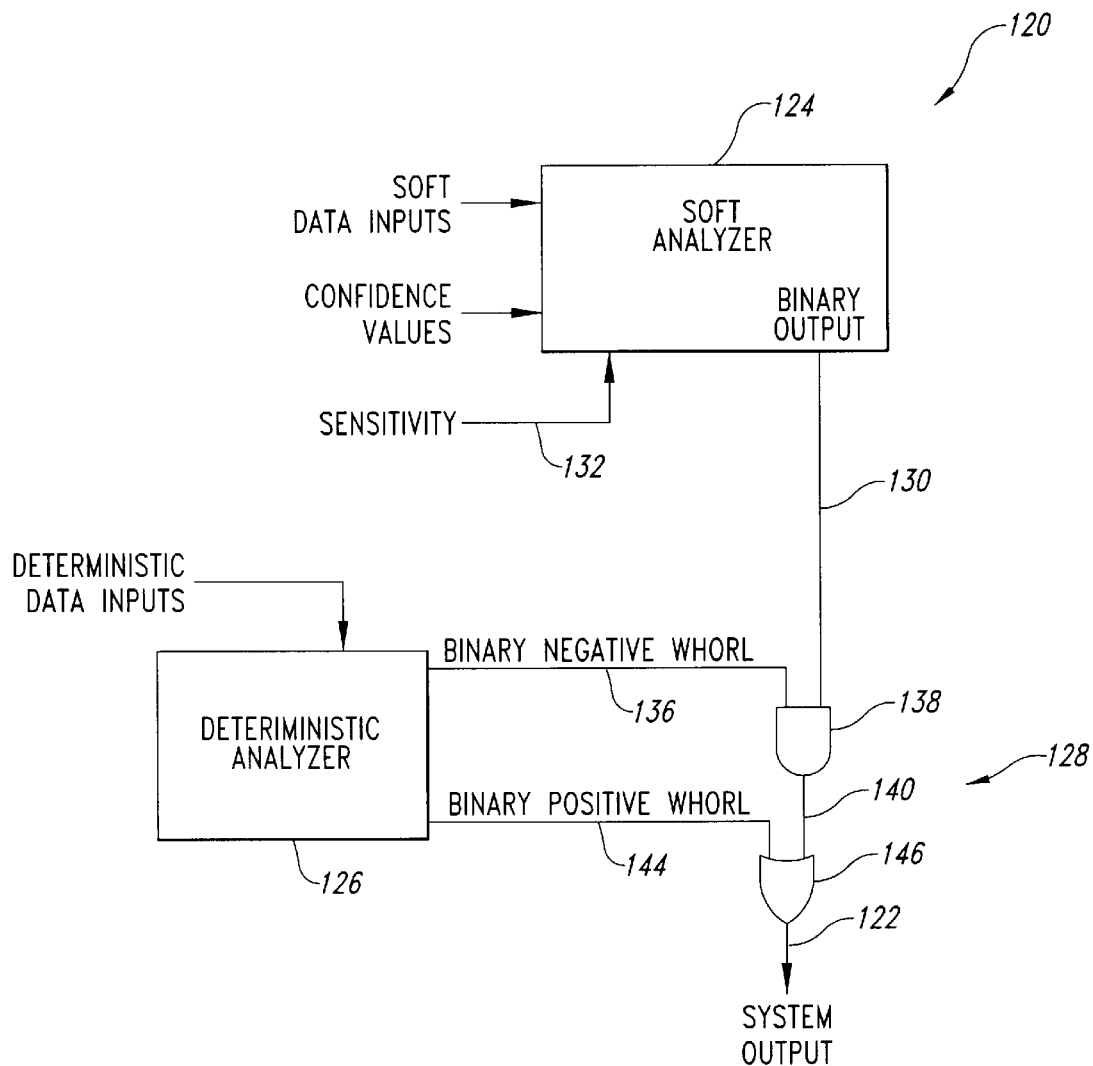
FIG. 5 illustrates one embodiment of the decision engine of the system of FIG. 4.

A more detailed description of the decision engine 120, and its various inputs, is illustrated in FIG. 5. In the illustrated embodiment, the decision engine 120 includes a soft analyzer 124, a deterministic analyzer 126, and a combinatorial logic circuit 128. The decision engine 120 may be characterized as casting "votes," with a YES vote indicating that the present call is valid and a NO vote indicating that the present call is invalid. The soft analyzer 124 casts a single YES/NO vote based on the soft data inputs and confidence values. The deterministic analyzer 126 casts two independent votes. The first vote by the deterministic analyzer 126, generated on a binary negative whorl control line 136, is always a YES vote unless the deterministic analyzer can definitively identify the present call as invalid. The second vote by the deterministic analyzer 126, generated on a binary positive whorl control line 144, is always a NO vote unless the deterministic analyzer can definitively identify the present call as valid.

The three votes (one vote from the soft analyzer 124 and two votes from the deterministic analyzer 126) are combined by the combinatorial logic circuit 128 in a unique manner that allows the votes from the deterministic analyzer to override the vote from the soft analyzer. Specifically, a NO vote on the binary negative whorl control line 136 effectively overrules any vote (i.e., a YES vote or NO vote) from the soft analyzer 124. However, a YES vote on the binary positive whorl control line 144 effectively overrules a NO vote on the binary negative whorl control line 136 and any vote (e.g., a YES or NO vote) by the soft analyzer 124. Operational details of the soft analyzer 124, the deterministic analyzer 126, and the combinatorial logic circuit 128 are provided below.

The soft analyzer 124 accepts data inputs and confidence values from soft data portions of the system 100, such as the customer call profile 114 and the signature analyzer 116. As previously discussed, the transmission characteristics of the unauthenticated cellular telephone rarely provide an exact match with the stored reference waveforms. Therefore, the signature analyzer 116 can never identify the transmission from the unauthenticated transmitter with 100% certainty. Rather, the signature analyzer 116 generates a data value indicative of the variability of the transmission characteristic of the unauthenticated cellular telephone compared with the stored reference waveforms and a confidence value indicative of the reliability of the data value. Similarly, the customer call profile 114 generates a data value indicating that there is a match between the values of one or more calling parameters of the present communication with the unauthenticated cellular telephone and corresponding calling parameter values stored in the customer call profile. The customer call profile 114 also generates a confidence value indicating the degree to which the values of the calling parameters of the communication with the unauthenticated cellular telephone match the stored parameter values.

For the sake of simplicity, FIG. 5 illustrates the soft analyzer 124 as having a single data input and a single confidence value input. However, the soft analyzer 124 may receive a plurality of data inputs and corresponding confidence values from various soft data portions of the system. While the examples above discuss the signature analyzer 116 and customer call profile 114, those of ordinary skill in the art will recognize that many other imprecise measurements may be supplied as data inputs and confidence values to the soft analyzer 124. For example, the signature analyzer 116 may be used to analyze both the turn-on transient 50 (see FIG. 3) and the turn-off transient 52 with the analysis of each portion of the transmission generating independent data values and corresponding confidence values. Other types of transmission characteristics may also be used. Thus, the signature analyzer 116 may supply a plurality of data inputs and confidence values to the soft analyzer 124. In addition, other measures, such as a deviation from a center frequency of the selected control channel frequency or variations in a "received signal strength index" (RSSI), may also be used to generate data values and confidence values for the soft analyzer 124. Therefore, the present invention is not to be limited to the specific examples of soft data described herein.

The soft analyzer 124 combines the various data inputs and confidence values and generates a binary output 130 having a high logic level (i.e., a YES vote) if the soft analyzer 124 determines that the present call is valid. The soft analyzer 124 generates a low logic level (i.e., a NO vote) at the binary output 130 if the soft analyzer determines that the present call is invalid.

Figures 6A, 6B:
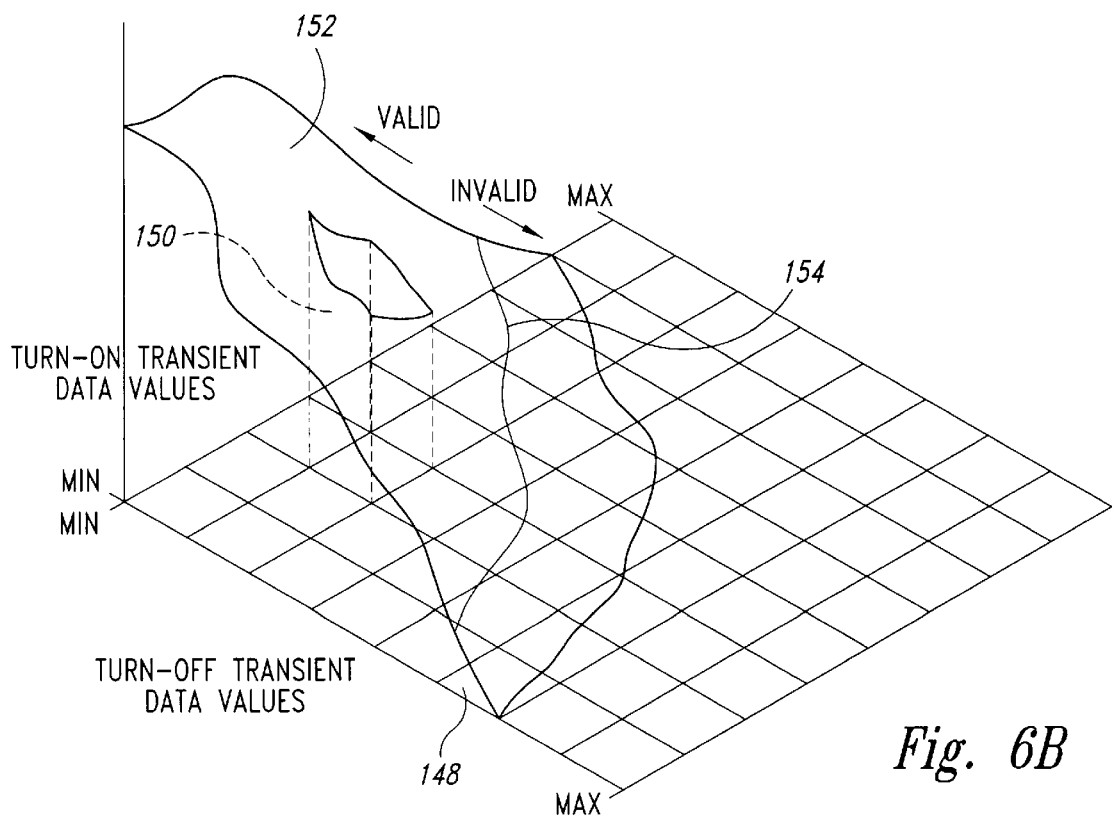
FIG. 6A graphically illustrates a technique to combine multiple data inputs to the decision engine of FIG. 5.
FIG. 6B graphically illustrates the operation of the decision engine of FIG. 5 to classify cellular telephone calls using the data of FIG. 6A.

The decision engine 120 performs an analysis of each call from an unauthenticated cellular telephone. This includes analysis of soft data inputs and confidence values by the soft analyzer 124 and analysis of deterministic data inputs by the deterministic analyzer 126. However, as will be discussed in greater detail below, the analysis by the soft analyzer 124 may be omitted if the deterministic analyzer 126 has definitively identified the present call as valid or invalid. The analysis of soft data inputs by the soft analyzer 124 may now be presented. As previously discussed, the soft analyzer 124 combines soft data inputs and confidence values from a variety of inputs. The soft analyzer 124 combines the probabilistic data inputs to generate the binary output 130. FIG. 6A illustrates one technique used by the soft analyzer 124 to combine independent soft data inputs and generate the binary output 130. In the example presented in FIG. 6A, two independent inputs are combined by the soft analyzer 124 and shown as a two-dimensional array. In the example of FIG. 6A, the transmission characteristic from the turn-on transient 50 (see FIG. 3) and the turn-off transient 52 from the unauthenticated cellular telephone are combined as part of the analysis by the soft analyzer 124. As previously discussed, the signature analyzer 116 (see FIG. 4) generates a data value and a confidence value for each of the transmission characteristics. The confidence values generated by the signature analyzer 116 are used to scale the data values for each input to the soft analyzer 124. Thus, the confidence value associated with the turn-on transient 50 is used to scale the data value for the turn-on transient. Similarly, the confidence value corresponding to the turn-off transient 52 is used to scale the data value for the turn-off transient. The scaled data value for the turn-on transient 50 and the data value for the turn-off transient 52 each have an acceptable range of values designated in FIG. 6A as between the minimum and maximum values. The scaled data values for the turn-on transient 50 and the turn-off transient 52 are illustrated in FIG. 6A in the form of a two-dimensional table with each pair of possible data values for the turn-on transient and turn-off transient being represented by a cell or bin 148.

When the table illustrated in FIG. 6A is initially generated, there are no data values in any of the bins 148. The scaled data values for each of the transmission characteristics are generated in a manner described below and entered into the table of FIG. 6A. The data values for each of the transmission characteristics from FIG. 6A are plotted in FIG. 6B in the form of a histogram where each bin 148 represents a pair of scaled data values.

The data for the table of FIG. 6A and the histogram of FIG. 6B are generated prior to any analysis of an unauthenticated cellular telephone. The soft analyzer 124 operates in a data gathering mode and collects data from a large variety of cellular telephones. The soft analyzer 124 is supplied with scaled data values from a large variety of authorized cellular telephones and a large number of scaled data values from the variety of fraudulent cellular telephones while operating in the data gathering mode. A database containing transmission characteristics from 150,000 cellular telephone calls is collected. From the database, 5,000 random transmission characteristics are selected and supplied to the soft analyzer 124 while in the data gathering mode. In addition to the 5,000 samples, the soft analyzer 124 is also provided with data indicating whether the samples are from an authorized cellular telephone or a fraudulent cellular telephone. If the data values are from an authorized cellular telephone, a bin count for the bin 148 corresponding to the pair of values is incremented. However, if the data values are from a fraudulent cellular telephone, the bin count for the bin 148 corresponding to the data value pair is decremented. This process is repeated for each of the data samples. After analyzing a large number of data samples, each of the bins 148 will contain a bin count that is either a positive integer, indicating that a number of authorized cellular telephones have data value pairs corresponding to that bin, a negative integer, indicating that a number of fraudulent cellular telephones have data value pairs corresponding to the bin, or a zero, indicating that an equal number of authorized and fraudulent cellular telephones have data value pairs corresponding to that bin or that no cellular telephones (authorized or fraudulent) have data value pairs corresponding to the particular bin.

The soft analyzer 124 then classifies each bin 148 as corresponding to either an authorized cellular telephone or a fraudulent cellular telephone based on the bin count. It should be noted that the histogram of FIG. 6B is included to provide a graphical illustration of the analysis by the soft analyzer 124. In operation, the soft analyzer 124 uses a data table such as illustrated in the example of FIG. 6A. The histogram of FIG. 6B is generated in the manner described above and may be subsequently used to determine whether a cellular telephone call from an unauthenticated cellular telephone is valid or invalid based on scaled data values for the transmission characteristics of the unauthenticated cellular telephone. For example, if the scaled data values for the turn-on transient 50 (see FIG. 3) and turn-off transient 52 for the unauthenticated cellular telephone fall within a bin 148 corresponding to a fraudulent cellular telephone, the unauthenticated cellular telephone is designated as fraudulent. However, if the scaled data values for the turn-on transient 50 and turn-off transient 52 for the unauthenticated cellular telephone are within a bin corresponding to an authorized cellular telephone, the unauthenticated cellular telephone is designated as an authorized cellular telephone.

The system 100 uses the histogram of FIG. 6B to set a threshold for the validity of future communications based on the combined data values for the turn-on transient 50 and the turn-off transient 52. This concept is illustrated in FIG. 6B where a curved spatial surface 152 represents the total number of valid calls processed by the system 100 for each of the bins 148. A line on the curved surface 152 based on the number of rejected good calls can be used to set a threshold. For example, the threshold may be set so that the number of good calls rejected by the system 100 is 1% of the total number of good calls. In FIG. 6B, a threshold 154 (represented by a line) represents a predetermined number (e.g., 1% of the total valid calls) that are rejected by the system 100. With calls falling below the threshold 154 being rejected (i.e., the call is denied) while calls that are above the threshold are allowed (i.e., the call is processed). The present telephone call is determined by the soft analyzer 124 to be a valid telephone call if the scaled data values for the turn-on transient 50 and the turn-off transient 52 are contained within a bin 148 whose bin count intersects the curved surface 152 above the threshold 154. However, the present telephone call is determined by the soft analyzer 124 to be an invalid call if the scaled data values for the turn-on transient 50 and the turn-off transient 52 are contained within a bin 148 whose bin count intersects the curved surface 152 below the threshold 154. In the example of a particular bin 150 illustrated in FIGS. 6A and 6B, the bin count intersects the curved surface 152 above the threshold 154. Therefore, any cellular telephone call whose scaled data value for the turn-on transient 50 and scaled data value for the turn-off transient 52 fall within the particular bin 150 will be designated by the soft analyzer 124 as a valid call.

The soft analyzer 124 also includes a sensitivity input 132. The sensitivity input 132 is used to set the threshold 154. For example, the threshold 154 could be increased by increasing the percentage of valid telephone calls that are rejected by the system 100 (e.g., 2% of the total valid calls). An increase in the threshold 154 effectively causes the soft analyzer 124 to reject more calls and designate calls as valid only if the calls meet more stringent requirements for the combined scaled data values. In this manner, the operator of the cell site controller 24 can shift the threshold 154 as required at each particular cell 22 (see FIG. 1B). The threshold 154 may also be increased during a period of day in which a large number of fraudulent cellular telephone calls normally occur. Similarly, the threshold 154 can be increased in cells 22 or other geographical locations where a greater number of fraudulent cellular telephone calls occur.

FIGS. 6A and 6B above illustrate the combination of soft data for the turn-on transient 50 (see FIG. 3) and the turn-off transient 52. However, those skilled in the art will recognize that other soft data inputs can be combined in a similar fashion. Furthermore, the soft data inputs to the soft analyzer 124 are not limited to transmission characteristics, but may include other parameters such as the customer call profile 114 (see FIG. 4). In addition, FIGS. 6A and 6B provide an illustration of the graphical combination of soft data from two data sources.

Those skilled in the art will recognize that the multiple soft data inputs may be combined analytically rather than graphically. Each bin 148 is designated as valid or invalid based on the threshold selected by the cell site operator. In the example above, the threshold 154 is set so that 1% of valid calls from the authorized cellular telephone are rejected by the soft analyzer 124. The soft analyzer 124 selects a threshold value, designated herein by a constant K. The soft analyzer 124 designates all bins as valid if the bin count is greater than or equal to the constant K. The bin counts in each of the bins 148 are normalized prior to the selection of the constant K. As previously discussed, the bin count equals the number of good calls for each bin 148 minus the number of bad calls for that particular bin. To normalize the bin count, the soft analyzer 124 divides the bin count by the total number of calls for each bin 148. For example, consider the particular bin 150 which has a bin count of 6, as shown in FIG. 6A. This may result, for example, from a total of 14 calls, 10 of which were from an authorized cellular telephone and 4 of which were from a fraudulent cellular telephone. The particular bin 150 is normalized by dividing the bin count by the total number of calls for the particular bin. In the example above, the normalized bin count for the particular bin 150 is 6/14. All bins 148 whose bin count is less than the predetermined constant K are designated as invalid. With the classification of all bins as valid or invalid, it is then possible to calculate how many calls from authorized cellular telephones will be rejected as a percentage of the total number of calls analyzed by the soft analyzer 124. The constant K is selected based on the percentage of valid calls that will be rejected by the soft analyzer 124. To select the value for the constant K, the soft analyzer 124 selects an initial value for K based on the sensitivity input 132. In the above example of a 1% threshold selected by the system operator using the sensitivity input 132, the soft analyzer 124 selects the initial value for the constant K and performs the analysis described above. The soft analyzer 124 determines how many valid calls from authorized cellular telephones would be rejected based on the designation of valid bins and invalid bins. If more than 1% of valid calls would be rejected, the value of K is decreased and the process of designating bins as valid or invalid is repeated using the modified value of K. Eventually, the 1% threshold will be reached, and the designation of bins as valid or invalid is thus completed. If the initial value selected for K results in less than 1% of the valid calls being rejected by the soft analyzer 124, the value of K is increased until the 1% rejection threshold is reached. As discussed above, the cell site operator can alter the threshold as desired (e.g., 2% of the total valid calls). If the threshold is altered, the soft analyzer 124 reclassifies the bins as valid or invalid until the 2% threshold is achieved. The principles of FIGS. 6A and 6B can be readily extended to multiple soft data sources using an N-dimensional array rather than the two-dimensional array of FIG. 6A.

Following the selection of the value for the constant K, the soft analyzer 124 is ready to analyze data from unauthenticated cellular telephones. For each call, the soft analyzer 124 will designate the unauthenticated cellular telephone as valid or invalid based on the bin 148 corresponding to the transmission characteristics for the unauthenticated cellular telephone. As previously discussed, the soft analyzer 124 designates each bin 148 as valid or invalid. A valid bin corresponds to an authorized cellular telephone while an invalid bin corresponds to a fraudulent cellular telephone. If the particular data values (such as the data values for the turn-on and turn-off transients 50 and 52) for the unauthenticated cellular telephone corresponds to a valid bin, the soft analyzer casts a YES vote on the binary output 130 (see FIG. 5). On the other hand, if the data values from the unauthenticated cellular telephone correspond to an invalid bin, the soft analyzer 124 generates a NO vote at the binary output 130. This same process may readily be extended to an N-dimensional array of bins for more than two soft data inputs.

In operation, the signature analyzer 116 (see FIG. 4) will produce data values associated with the unauthenticated cellular telephone. The data values are scaled by the confidence values, as described above, resulting in a range of scaled data values between the minimum and maximum values for each of the soft data inputs. The combination of scaled data input will correspond to a bin 148 that has previously been designated as valid or invalid based on the constant K. While the example of FIGS. 6A and 6B utilize only two soft data inputs, the soft analyzer 124 can analyze a large number of soft data inputs. For example, if multiple transmission characteristics and data from the customer call profile 114 (see FIG. 4) provide 8 soft data inputs, the table of FIG. 6A would be an 8-dimensional array with each bin in the 8-dimensional array being designated as valid or invalid based on the constant K. Thus, all transmission characteristics and other soft data are combined into an N-dimensional array by the soft analyzer 124. Each bin 148 in the N-dimensional array will be designated as valid or invalid based on the constant K, as described above. Each call from an unauthenticated cellular telephone will result in N soft data inputs corresponding to the N soft data inputs in the N-dimensional array. If the data values associated with the unauthenticated cellular telephone correspond to a valid bin, the soft analyzer 124 generates a YES vote at the binary output 130. If the data values associated with the unauthenticated cellular telephone correspond to an invalid bin, the soft analyzer 124 generates a NO vote at the binary output 130. It should be noted that the bin count in a bin 148 may equal 0. This may result from the bin 148 having no calls, or having an equal number of calls from the authorized cellular telephone and the fraudulent cellular telephone during the data gathering mode. In one embodiment, the soft analyzer 124 defines any bin having a bin count of 0 as corresponding to a valid telephone call. In an alternative embodiment, the soft analyzer 124 may interpolate bin counts from adjacent bins 148. Thus, any bin 148 with a bin count equal to 0 would be replaced with a bin count interpolated from adjacent bins. The interpolation process has the effect of smoothing the curved spatial surface 152 (see FIG. 6B). Interpolation is a well-known mathematical process and need not be described in greater detail herein.

Thus, the soft analyzer 124 is capable of combining multiple soft data inputs and classifying the present call as valid or invalid based on the designation of a bin corresponding to the data values associated with the unauthenticated cellular telephone. The technique described above is only one of many different possible techniques to combine soft data inputs. Those of ordinary skill in the art will recognize that other conventional techniques may also be used to combine multiple soft data inputs. For example, the soft analyzer 124 may use conventional correlation-based statistical techniques to combine the soft data for multiple data sources. Other techniques, such as a neural network, principal component analysis, singular value decomposition, and the like may also be readily employed by the soft analyzer 124. Other maximum likelihood estimators or traditional decision-tree analysis, such as ID3, can also be used by the soft analyzer 124. These techniques are well known to those of ordinary skill in the art and need not be described herein. Thus, the present invention is not limited by the type of conventional techniques used to combine multiple data inputs.

Returning again to FIG. 5, the deterministic analyzer 126 uses a plurality of deterministic data inputs to determine whether the present call is valid or invalid. The deterministic analyzer 126 includes data obtained through a variety of different analysis techniques. Unlike the soft analyzer 124, which combines a plurality of soft data inputs and produces the single binary output 130, the deterministic analyzer 126 accepts a plurality of deterministic data inputs and produces two output signals, both of which are capable of overruling the decision of the soft analyzer. The first output from the deterministic analyzer 126 is the binary negative whorl control line 136 which has a high logic level if the deterministic analyzer determines that the present call is valid and a low logic level if the deterministic analyzer determines that the present call is invalid.

If the deterministic analyzer 126 determines that the present call is invalid, the low logic level on the binary negative whorl control line 136 effectively overrules any decision of the soft analyzer 124. For example, the deterministic analyzer 126 can analyze the dialed digits from the present cellular telephone call and compare the dialed digits with a list of known fraudulent numbers stored in the data storage area 112 (see FIG. 4). If the dialed digits from the present call match any of the known fraudulent numbers in the data storage area 112, the deterministic analyzer 126 casts a NO vote on the binary negative whorl control line 136. The deterministic analyzer 126 casts a NO vote on the binary negative whorl control line 136 only if it can definitively identify the present call as invalid. The binary negative control line 136 is termed a "negative" control line because a negative result (ie., a NO vote) is reached if the present call is identified as invalid.

The binary negative whorl control line 136 from the deterministic analyzer 126 and the binary output 130 from the soft analyzer 124 are combined by an AND gate 138 in the combinatorial logic circuit 128. If both the binary output 130 and binary negative whorl control line 136 have high logic levels (i.e., YES votes), the AND gate 138 generates a high logic level (i.e., a YES vote) at an output 140. The YES vote at the AND gate output 140 indicates that the present call is considered to be a valid call from the authorized cellular telephone 4. In contrast, if either the binary output 130 of the soft analyzer 124 or the binary negative whorl control line 136 from the deterministic analyzer 126 are at a low logic level (i.e., a NO vote), the AND gate output 140 will also be at a low logic level (i.e., a NO vote), indicating that the present call is considered an invalid call from a fraudulent cellular telephone. Thus, a YES vote at the AND gate output 140 is cast only if the binary output 130 of the soft analyzer 124 and the binary negative whorl control line 136 of deterministic analyzer 126 have both cast YES votes, indicating that the present call is a valid telephone call from the authorized cellular telephone 4.

The example of the binary negative whorl control line 136 presented above involves an analysis of known fraudulent numbers by the deterministic analyzer 126. However, the present invention is not limited only to the use of known fraudulent numbers as a means of generating high or low logic levels on the binary negative whorl control line 136, but is intended to include any deterministic data that can identify the present call as invalid. For example, the transmission characteristics of some cellular telephones include the pre-dotting waveform, discussed above. If the authorized cellular telephone 4 includes such a pre-dotting transmission characteristic, and the transmission characteristic of the unauthenticated cellular telephone in the present call does not include this pre-dotting transmission characteristic, the deterministic analyzer 126 can definitively determine that the present call is an invalid call from a fraudulent cellular telephone. Similarly, if the transmission characteristics from the authorized cellular telephone 4 do not include the pre-dotting transmission characteristic, and the transmission characteristic from the unauthenticated cellular telephone in the present call does include such a pre-dotting characteristic, the deterministic analyzer 126 will definitively determine that the present call is an invalid call from the fraudulent cellular telephone. In either case, the deterministic analyzer 126 will cast a NO vote on the binary negative whorl control line 136.

Another example of data analysis by the deterministic analyzer 126 involves the use of the Redial button 10a (see FIG. 2). Any real-time signature analysis system is vulnerable to attack by fraudulent users who attempt to overload the system by flooding it with calls. For example, the fraudulent user can simply press the Redial button 10a on the keypad 10 or manually redial the desired number if the call is denied a first time. By repeatedly redialing the desired number, the fraudulent user may be able to place a call over and over in quick succession and overwhelm the cell site controller 24 to force acceptance of the call without the real-time signature analysis being conducted. The deterministic analyzer 126 works in combination with the signature analyzer 116 (see FIG. 4) in an effort to reduce the vulnerability of the system to attack by redial. This aspect of the system 100 is described in copending U.S. patent application Ser. No. 08/738,264, entitled "System And Method For Detection Of Redial Fraud In A Cellular Telephone System," filed on Oct. 25, 1996, which is incorporated herein by reference in its entirety. In that application, the system 100 tracks calls that are rejected by the soft analyzer 124 on the basis of analysis by the signature analyzer 116 (see FIG. 4). If the decision engine 120 determines that the current call from the unauthenticated cellular telephone is an invalid call from a fraudulent cellular telephone based on analysis by the soft analyzer 124, the geographic area of the unauthenticated cellular telephone, time of the present communication, and dialed digits are stored temporarily in the data storage area 112 (see FIG. 4). The present call is processed by the remaining portions of the decision engine 120 in the manner described above. If, following a denial of the present call by the cell site controller 24, the user attempts to force acceptance of a call by pressing the Redial button 10a, the system 100 will again perform an analysis using the soft analyzer 124 in the manner described above. However, if a predetermined number of calls (e.g., three calls) have been made from the same unauthenticated cellular telephone in the same geographic area or to the same dialed digits within a predetermined period of time (e.g., thirty minutes), the deterministic analyzer 126 may reject the present call without the need for analysis by the signature analyzer 116. Under these circumstances, the deterministic analyzer 126 will cast a NO vote on the binary negative whorl control line 136.

In a presently preferred embodiment, the deterministic analyzer 126 will cast a NO vote on the binary negative whorl control line 136 only if the output of the soft analyzer 124 has determined that three prior calls within a selected past period of time (e.g., 30 minutes) from the same cellular telephone have all been fraudulent. The deterministic analyzer 126 may also cast a NO vote based on the dialed digits combined with the geographic area and time constraints described above.

It should be noted that deterministic analyzer 126 may not always be able to definitively characterize the present call as valid or invalid. For example, it is possible that the transmission characteristic from both the authorized cellular telephone 4 and the unauthenticated cellular telephone in the present call both have the same pre-dotting transmission characteristic. Under such circumstances, the deterministic analyzer 126 will always cast a YES vote on the binary negative whorl control line 136 to indicate that it cannot absolutely identify the present call from the unauthenticated cell phone as invalid. Similarly, the deterministic analyzer 126 will cast a YES vote on the binary negative whorl control line 136 if the dialed digits from the present call are not contained in the list of known fraudulent numbers in the data storage area 112 (see FIG. 4). This does not mean that the present call is valid, it simply means that the present call cannot be definitively identified as invalid based on the available deterministic data. In this situation, other portions of the decision engine 120 will cast the deciding votes.

The deterministic analyzer 126 also performs a separate analysis that can positively identify the present call from the unauthenticated cellular telephone as a valid call from the authorized cellular telephone 4. For example, the deterministic analyzer 126 can compare the dialed digits from the present call from the unauthenticated cellular telephone with a list of known valid numbers stored in the data storage area 112 (see FIG. 4). If the dialed digits from the present cellular telephone call match any of the telephone numbers stored as known valid numbers in the data storage area 112, the deterministic analyzer 126 generates a high logic level (i.e., a YES vote) on the binary positive whorl control line 144.

The binary positive whorl control line 144 is combined with the AND gate output 140 by an OR gate 146. The output of the OR gate 146 is the system output 122. As previously discussed, a high logic level (i.e., a YES vote) at the system output 122 indicates that the decision engine 120 has determined that the present call from the unauthenticated cellular telephone is a valid call from the authorized cellular telephone 4. Conversely, the decision engine 120 generates a low logic level (i.e. a NO vote) at the system output 122 if the decision engine determines that the present call from the unauthenticated cellular telephone is an invalid call from a fraudulent cellular telephone. As those of ordinary skill in the art can appreciate, the OR gate 146 effectively allows a YES vote on the binary positive whorl control line 144 to overrule the AND gate output 140. That is, a YES vote on the binary positive whorl control line 144 will cause the cell site controller 24 to process the present call as valid regardless of the vote by the soft analyzer 124 at the binary output 130 or the vote by deterministic analyzer 126 on the binary negative whorl control line 136. Thus, a YES vote on either the binary positive whorl control line 144 or the AND gate output 140 will cause a YES vote at the system output 122, causing the cell site controller 24 (see FIG. 4) to process the present call as valid.

The analysis of known valid numbers by the deterministic analyzer 126 is provided as one example of a technique to generate a high or a low logic level on the binary positive whorl control line 144. However, the present invention is not limited only to the analysis of known valid numbers, but is intended to include any definitive analysis that can positively identify the present call as valid. Furthermore, under some circumstances, the deterministic analyzer 126 may generate a YES vote on the binary positive whorl control line 144 even if the present call from the unauthenticated cellular telephone is believed to be an invalid call from a fraudulent cellular telephone. For example, calls to emergency numbers (e.g., 911) can be processed by the cell site controller 24 regardless of any analysis that designated the present call as invalid.

As discussed above, the deterministic analyzer 126 will only cast a NO vote on the binary negative whorl control line 136 if it can definitively identify the present call as invalid. In contrast, the deterministic analyzer 126 will always cast a NO vote on the binary positive whorl control line 144 unless it can definitively identify the present call as valid. Thus, the deterministic analyzer 126 will normally cast a NO vote on the binary positive whorl control line 144. Under this condition the vote on the AND gate output 140 controls the results of the vote on the system output 122.

In summary, the decision engine 120 includes the soft analyzer 124 which generates the binary output 130 based on a statistical analysis of data. However, as its name implies, the soft analyzer 124 analyses data having inherent uncertainties. Therefore, the results of the soft analyzer 124 can be modified by the binary negative whorl control line 136 or the positive binary whorl control line 144 from the deterministic analyzer 126. As its name implies, the analysis of the deterministic analyzer 126 is based on precise data without the inherent uncertainties of soft data. For example, dialed digits are either contained in the list of known fraudulent numbers in the data storage table 112 or they are not present in the list. Similarly, the dialed digits are either contained in the list of known valid numbers stored in the data storage area 112 or they are not contained in the list. Thus, the decision engine 120 uses probabilistic and deterministic data, and the combinatorial logic circuit 128 that combines the outputs of the soft analyzer 124 and the deterministic analyzer 126 to produce a decision that the present call is valid or invalid. The combinatorial logic circuit 128 is illustrated in FIG. 5 as a combination of logic gates. However, those of ordinary skill in the art will recognize that the logical function provided by the combinatorial logic circuit 128 may easily be implemented by a series of program instructions executed by the CPU 108 (see FIG. 4).

For the sake of clarity, the system 100 illustrated in FIG. 5 shows a single binary negative whorl control line 136 and a single binary positive whorl control line 144. The results of the various types of deterministic data analysis are combined by the deterministic analyzer 126 to produce the single binary negative whorl control line 136 and the single binary positive whorl control line 144. However, as those of ordinary skill in the art can readily appreciate, the deterministic analyzer 126 can provide more than one binary negative whorl control line 136 and binary positive whorl control line 144. For example, the deterministic analyzer 126 may comprise a series of separate sub-analyzers each generating its own binary positive or binary negative whorl control line. In addition to the known valid numbers, for example, the deterministic analyzer 126 can include a second binary positive whorl control line 144 for predesignated numbers, such as emergency telephone numbers (e.g., 911). Similarly, the system 100 can include multiple binary negative whorl control lines 136. In addition to the known fraudulent numbers list, for example, the deterministic analyzer 126 can include a second binary negative whorl control line 136 to indicate the presence or absence of pre-dotting in the transmission characteristic. Thus, the present invention is not limited solely to a single binary negative whorl control line 136 or a single binary positive whorl control line 144.

The decision engine 120 has several alternative forms. In one form, illustrated in FIG. 5, the decision engine 120 includes the soft analyzer 124. In another embodiment, the decision engine 120 includes a fuzzy logic classifier 160, illustrated in FIG. 7. Fuzzy logic is a concept originally developed to provide computer models for human perceptual characteristics. For example, computer databases may readily classify a population of subjects based on height (e.g., persons greater than 6 feet and persons less than 6 feet). However, the same database is incapable of characterizing the same population as "tall" or "short." In the example of height classification, the term "tall" is relative. The classification of tall might apply to all individuals above 5 feet if one is considering a population of grade school students, while the classification of tall may only apply to people over 7 feet if the population is professional basketball players. Fuzzy logic attempts to model these types of perceptual categories by creating a series of sets and subsets and assigning membership of individuals to various subsets based on the total population. The concepts of fuzzy logic and fuzzy logic sets are discussed in "The Engineering of Knowledge-Based Systems Theory and Practice," by Avelino J. Gonzalez and Douglas D. Dankel, Prentiss-Hall, Englewood Cliffs, N.J., 1993, Chapter 8.5. However, the concepts of fuzzy logic are well known and will be discussed only with respect to the system 100.

Figure 7:
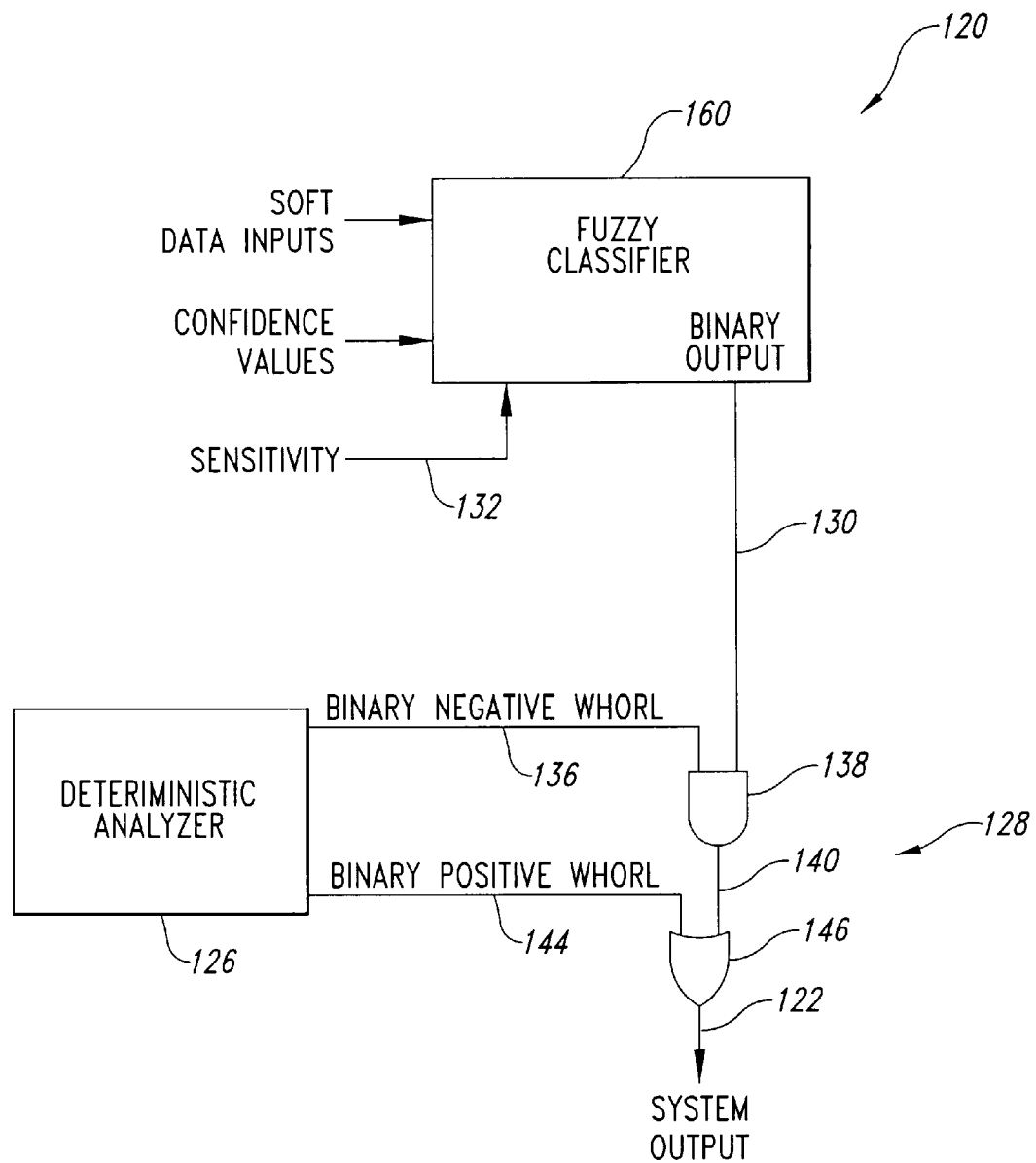
FIG. 7 illustrates an alternative embodiment of the decision engine of the system of FIG. 4.

The decision engine 120 of FIG. 7 is developed using a commercial fuzzy logic product, such as the Matlab Fuzzy Logic Toolbox computer program, Version 4.2(c), to derive coefficients for the fuzzy logic classifier 160. With the fuzzy logic classifier 160, the various whorls, such as the outputs of the customer call profile 114 and the signature analyzer 116, provide data to the fuzzy logic classifier. As described above, the soft analyzer 124 uses confidence values to scale the data input values. In contrast, the fuzzy classifier 160 does not scale the data values using confidence values, but treats the confidence values themselves as simply additional data inputs to the fuzzy classifier. The confidence values and soft data from the various sources described above are provided as inputs to the fuzzy logic classifier 160, which produces the binary output 130. It should be noted that the soft analyzer 124 (see FIG. 5) will always produce the same result for a given set of inputs. That is, the soft analyzer 124 will produce the same binary output each time it receives an identical set of data values and confidence values for a given setting on the sensitivity input 132. Similarly, the fuzzy logic classifier 160 will produce the same binary output for a given set of inputs. Thus, neither the soft analyzer 124 nor the fuzzy logic classifier 160 generate the binary output 130 based on probabilistic analysis. However, the data supplied to the soft analyzer 124 or the fuzzy logic classifier 160 may be considered probabilistic in nature because it is uncertain. As previously discussed, the analysis by the signature analyzer 116 (see FIG. 4) is never 100% certain and thus may be considered as soft data.

The Matlab Fuzzy Logic Toolbox has a "learn" mode, similar to the data gathering mode discussed above with respect to the soft analyzer 124 (see FIG. 5), in which it is supplied with a large number of data input samples for each of the soft data inputs. It should be noted that the learn mode operations with the fuzzy logic classifier 160 are conducted prior to any analysis of unauthenticated cellular telephones. This permits the fuzzy logic classifier 160 to determine which combination of transmission characteristics and other soft data inputs are critical to the proper identification of unauthenticated cellular telephones. For example, the Fuzzy Logic Toolbox may be supplied with a number of samples of similarity measures for the turn-on transient 50 (see FIG. 3) from a large number of different cellular telephones. Based on the large number of data input samples, the Fuzzy Logic Toolbox will determine the number of membership functions that are required to properly characterize the particular transmission characteristic. The Fuzzy Logic Toolbox generates a Gaussian membership function to characterize each membership function for the particular transmission characteristic, each having the following general form:

$$g(x) = e^{-\frac{(\frac{x-\mu}{\sigma})^2}{2}} \quad (1)$$

where $\chi$ is the data value for the particular parameter, $\mu$ is the value of $\chi$ at the peak of the Gaussian membership function, and $\sigma$ is related to the width of the Gaussian membership function.

The fuzzy logic classifier 160 generates a set of rules covering each possible membership function. An example of the rules for the turn-on transient 50 (see FIG. 3) and the turn-off transient 52 is illustrated below in Table 1.

TABLE 1

| Rule No. | Rule |
|---|---|
| 1. | if < turn-on = good    AND turn-off = good > then pass |
| 2. | if < turn-on = good    AND turn-off = medium > then pass |
| 3. | if < turn-on = good    AND turn-off = bad > then pass |
| 4. | if < turn-on = medium AND turn-off = good > then pass |
| 5. | if < turn-on = medium AND turn-off = medium > then pass |
| 6. | if < turn-on = medium AND turn-off = bad > then fail |
| 7. | if < turn-on = bad    AND turn-off = good > then fail |
| 8. | if < turn-on = bad    AND turn-off = medium > then fail |
| 9. | if < turn-on = bad    AND turn-off = bad > then fail |

It should be noted that Table 1 is presented in the form of a pseudo-programming code using "if-then" statements. In the learn mode, the fuzzy logic classifier 160 creates the set of rules and determines whether membership in particular membership functions results in a pass or fail for a particular combination of parameters. It should be noted that Table 1 illustrates nine if-then statements, which results from two parameters with three possible classifications in each (i.e., $3^2=9$). As those skilled in the art can appreciate, a larger set of rules will result if more parameters are included or if more sets are created for each of the parameters. In general, there will be N rules generated by the fuzzy logic classifier 160 using the following equation:

$$N=S^P \quad (2)$$

where N is the number of rules, S is the number of sets required by the fuzzy logic classifier 160 to properly characterize a parameter, and P is the number of parameters analyzed by the fuzzy logic classifier 160. The fuzzy classifier 160 may generate a large number of rules based on the number of sets S and the number of parameters P. However, as will be described below, in practical implementations, only a few of the rules are critical for determining whether the present call is valid or invalid. Algorithms within the commercial fuzzy logic product generate a limited number of rules that are significant for classifying a given set of data. The fuzzy classifier 160 need only analyze the limited number of rules during actual operation. Thus, the fuzzy classifier 160 can perform an analysis of the unauthenticated cellular telephone call in real time by analyzing only a relatively few number of rules.

Table 1 above illustrates the 9 possible rules that result from three membership functions characterizing each of two parameters. The fuzzy logic classifier 160 need not analyze every possible combination of parameters to classify the present call as valid or invalid. In the learn mode, the fuzzy logic classifier 160 is provided with numerous membership functions, designated as "feature vectors," which contain data values for all possible measurement parameters associated with a single cellular telephone. The fuzzy logic classifier is provided with a large number of good feature vector sets associated with valid calls from a variety of authorized cellular telephones and a large number of bad feature vector sets associated with invalid calls from a variety of fraudulent cellular telephones. This is similar to the learn mode described above with respect to the soft analyzer 124 (see FIG. 5). The fuzzy logic classifier is also provided with information indicating whether a feature vector set is good or bad. The fuzzy logic classifier subsequently determines which of the multiple rules are critical in order to generate the proper results. For example, Table 1 contains 9 possible rules. Based on the analysis of the fuzzy classifier 160 while in the learn mode, the fuzzy classifier may determine that only rules 2, 3, 6, and 7 are necessary to classify calls as valid or invalid. Thus, in normal operation, the fuzzy classifier 160 would only analyze rules 2, 3, 6, and 7. As can be appreciated by those of skill in the art, the analysis of a relatively few number of rules can be performed in real time by the fuzzy classifier 160.

In the presently preferred embodiment, the fuzzy logic classifier is provided with approximately 5,000 sample feature vector sets selected from a database of input parameter data values from 150,000 cellular telephone calls. The 5,000 samples are randomly selected from the database. Based on these 5,000 calls, the fuzzy logic classifier 160 determines which rules are important, and need only analyze the relevant rules.

Once the fuzzy logic classifier 160 has generated the appropriate number of Gaussian membership functions and determined which rules are the most important in the learn mode, calls from the unauthenticated cellular telephone can be analyzed. The signature analyzer 116 determines and creates a feature vector for the unauthenticated cellular telephone corresponding to the data value and confidence value for the turn-on transient 50 for the present call in the manner previously described. Feature vector elements are created for each transmission characteristic analyzed by the signature analyzer 116. In addition, feature vector elements are created for each of the soft data inputs, such as the customer call profile 114 (see FIG. 4). The feature vector is analyzed by the fuzzy classifier 160 to determine whether the present call is a valid call or an invalid call.

Figure 8:
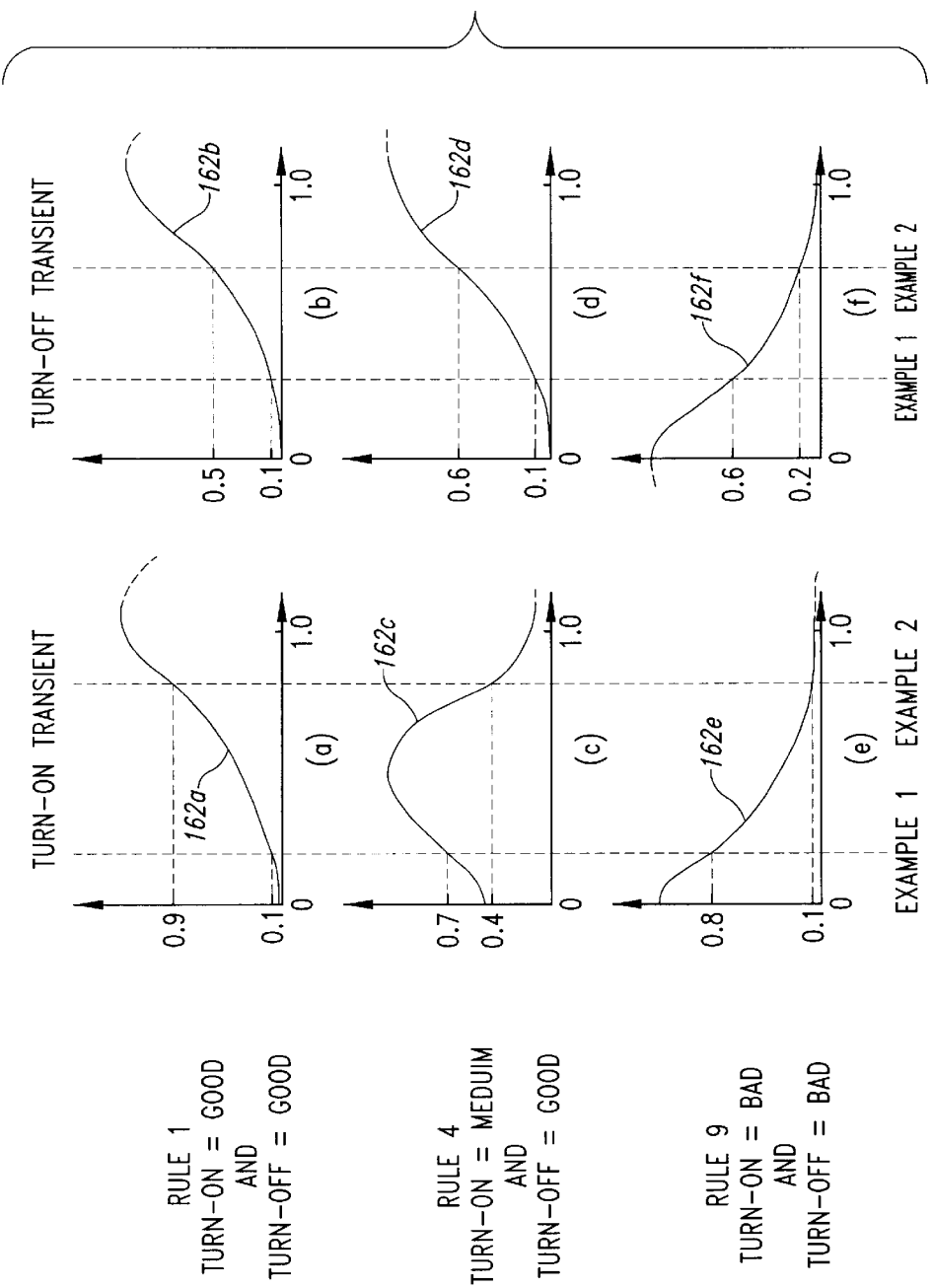
FIG. 8 illustrates the multiple Gaussian membership functions used by the decision engine of FIG. 7 to determine the validity of a cellular telephone call.

An example of the operation of the fuzzy classifier 160 is shown in FIG. 8 for 3 of the 9 rules shown in Table 1. FIG. 8 illustrates a Gaussian membership function 162a for the turn-on transient 50 (see FIG. 3) as shown in graph (a). Similarly, a Gaussian membership function 162b is shown for the turn-on transient 52 in graph (b). The Gaussian membership functions 162a and 162b correspond to rule 1 in Table 1. Gaussian membership functions 162c and 162d, corresponding to membership functions for the turn-on transient 50 and turn-off transient 52 for rule 4 in Table 1 are illustrated in graphs (c) and (d), respectively. In addition, FIG. 8 illustrates Gaussian membership functions 162e and 162f, corresponding to the turn-on transient 50 and turn-off transient 52 for rule 9 in Table 1 are shown in graphs (e) and (f), respectively. The signature analyzer 116 (see FIG. 4) calculates feature vectors for the turn-on transient 50 and turn-off transient 52 for the unauthenticated cellular telephone. FIG. 8 illustrates two examples of feature vectors, indicated as Example 1 and Example 2 from two different unauthenticated cellular telephones.

FIG. 8 illustrates three Gaussian membership functions for each of the parameters analyzed by the fuzzy classifier 160 (the turn-on transient 50 and the turn-off transient 52). However, in operation, the fuzzy classifier may have a large number of membership functions.

For the sake of clarity, the example of FIG. 8 includes only three Gaussian membership functions. It should be understood that the fuzzy logic classifier 160 may have a different number of membership functions to properly characterize different parameters. For example, it is possible that the turn-on transient 50 may require a larger number of Gaussian membership functions to properly characterize that parameter, while the turn-off transient 52 may require fewer Gaussian membership functions to properly characterize that parameter. In the presently preferred embodiment, each rule has the same number of Gaussian membership functions for every input.

In operation, the signature analyzer 116 analyzes the turn-on transient 50 and turn-off transient 52 of the unauthenticated cellular telephone with respect to stored reference waveforms for the turn-on and turn-off transients of the authorized cellular telephone. The signature analyzer 116 generates feature vector elements for the turn-on transient 50 and turn-off transient 52. The fuzzy logic classifier 160 determines a membership value for each of the Gaussian membership functions 162a to 162f for each feature vector. FIG. 8 provides a graphical illustration of the technique used by the fuzzy classifier 160 to determine membership values for each feature vector. Those of ordinary skill in the art can appreciate that the fuzzy logic classifier 160 analytically determines membership values in each of the respective membership functions using equation (1) above rather than the graphs of FIG. 8.

The advantage of the fuzzy logic classifier 160 is that it evaluates all relevant rules before making a final decision. The process for analyzing the rules will be described briefly below. The fuzzy logic classifier 160 determines the "strength" or match quality of each relevant rule using the process shown below in Table 2 and relies on the strongest rule to generate the binary output 130.

TABLE 2

1. out = 0
2. for each rule i
   3. fire strength$_i$ = 1; ruleout$_i$ = 0; totalfirestrength = 0
   4. for each input j
      5. firestrength$_i$ = firestrength$_i$*g$_{ij}$(X$_j$)
      6. ruleout$_i$ = ruleout$_i$ + X$_j$*K$_{ij}$
   7. end
   8. totalfirestrength = totalfirestrength + firestrength$_i$
   9. out = out + firestrength$_j$ *(ruleout$_j$ + bias$_j$)
10. end
11. out = out/totalfirestrength In the pseudocode shown in Table 2, the value $g_{ij}(X_j)$ is the membership value for each rule i for each input j, $X_j$ is the data value for each input j, $K_{ij}$ is a scaling constant used to scale the data values for each rule i and each input j, and bias$_j$ is another constant used to bias the each rules output. Each of the rules has an associated firestrength data value indicative of the degree of match between the data values and the particular rule.

In the example illustrated in FIG. 8, feature vectors are provided for the turn-on transient 50 and turn-off transient 52 for two different examples. Table 3 below illustrates the numerical analysis performed by the pseudocode in Table 2 using the examples from the membership functions and feature vectors illustrated in FIG. 8.

TABLE 3

|  |  | EXAMPLE 1 | EXAMPLE 2 |
|---|---|---|---|
| INPUT FEATURE | TURN-ON | 0.2 | 0.8 |
| VECTORS | TURN-OFF | 0.3 | 0.7 |

TABLE 3-continued

|  |  |  | EXAMPLE 1 | EXAMPLE 2 |
|---|---|---|---|---|
| MEMBERSHIP | TURN-ON | RULE 1 | 0.1 | 0.9 |
| VALUES |  | RULE 4 | 0.7 | 0.4 |
| (gij (Xj)) |  | RULE 9 | 0.8 | 0.1 |
|  | TURN-OFF | RULE 1 | 0.1 | 0.5 |
|  |  | RULE 4 | 0.1 | 0.6 |
|  |  | RULE 9 | 0.6 | 0.2 |
| FIRING STRENGTH |  | RULE 1 | 0.01 (0.02) | 0.45 (0.63) |
|  |  | RULE 4 | 0.07 (0.13) | 0.24 (0.34) |
|  |  | RULE 9 | 0.48 (0.86) | 0.02 (0.28) |
|  |  | TOTAL | 0.56 | 0.71 |
| RULE OUTPUT |  | RULE 1 | 0.2 (.11) | 0.8 (0.5) |
| d |  | RULE 4 | 2.4 (.31) | 1.6 (0.54) |
|  |  | RULE 9 | −.22 (−.19) | −.68 (−.19) |
| OUTPUT |  |  | 0.23 | 0.85 |

In the examples shown in Table 4, the firing strength values are shown as unnormalized data values and in parentheses as normalized data values. The normalized firing strength data values are calculated by dividing the unnormalized firing strength data values by the total unnormalized firestrength data values for the various rules. For example, rule 9 has an unnormalized data value of 0.48 and a normalized data value of 0.86 calculated with the following data values:

$$\frac{0.48}{0.01 + 0.07 + 0.48} = \frac{0.48}{0.56} = 0.86$$

The rule output data values are also shown in Table 4 prior to multiplication by the normalized firestrength data values and in parentheses following the multiplication by the normalized firestrength data values. For example, the rule output data values for rule 9 are calculated with the following data values:

$$0.2*(-0.1)+0.3*(-1.0)+0.1=-0.22$$

where 0.2 and 0.3 are the data values for the inputs, −0.1 and −1.0 are the corresponding scaling factors, and 0.1 is the bias value for rule 9. Multiplication by the normalized firestrength value for rule 9 (0.86) results in a rule output value of −0.19 (i.e., 0.86*−0.22 =−0.19).

The scaling constants and input bias values used by the fuzzy classifier are illustrated below in Table 4. These values are derived by the fuzzy classifier 160 while in the learn mode. In an exemplary embodiment, the values in Table 4 are derived by a well-known technique called subtractive clustering. This technique is described in "Fuzzy Model Identification Based on Cluster Estimation," by Stephen L. Chiu, *Journal of Intelligent and Fuzzy Systems* Vol. 2, pp.267–278, 1994, John Wiley & Sons, Inc.

TABLE 4

| INPUT | TURN-ON | RULE 1 | 1 |
|---|---|---|---|
| SCALE |  | RULE 4 | 0 |
| (Kij) |  | RULE 9 | −1 |
|  | TURN-OFF | RULE 1 | 0 |
|  |  | RULE 4 | −2 |
|  |  | RULE 9 | −1 |
| INPUT BIAS |  | RULE 1 | 0 |
| BIASi |  | RULE 4 | 3 |
|  |  | RULE 9 | 0.1 |

As shown in Table 3, membership values are mathematically determined using equation (1) above. Membership values are determined for each feature vector for each of the relevant rules. In the example illustrated in FIG. 8, only rule 1, rule 4, and rule 9 are illustrated. As previously discussed, the fuzzy classifier 160 determines which rules are relevant while in the learn mode. Table 3 also illustrates the firing strength value for each of the rules, as well as the total firing strength. The rule output, calculated in line 6 of Table 2, provides the output for each of the relevant rules. The fuzzy classifier applies the pseudocode of Table 2 to each input for each relevant rule to determine whether the present call is valid or invalid.

Finally, the fuzzy logic classifier 160 calculates an output based on the firestrength value, the ruleout value and the bias value. The fuzzy logic classifier 160 calculates the output using equation (3) below.

$$OUT = \frac{\sum_{rule=i} firestrength_i * (ruleout_i + bias_i)}{\sum_{rule=i} firestrength_i} \quad (3)$$

It should be noted that the OUT value generated using Equation (3) above has a value between 0 and 1. The fuzzy logic classifier 160 generates a high logic level (i.e., a YES vote) at the binary output 130 if the OUT value from Equation (3) is greater than or equal to 0.5, and generates a low logic level (i.e., a NO vote) at the binary output if the OUT value from Equation (3) is less than 0.5.

In the example of FIG. 8 and Table 3, data from example 1 provides an output value of 0.23 while the output value for the data from example 2 is 0.85. In accordance with the rules discussed above, the cellular telephone call associated with example 1 would be rejected as invalid by the fuzzy classifier 160. In contrast, the fuzzy classifier 160 would categorize the cellular telephone call associated with example 2 as a valid call. Thus, the fuzzy logic classifier 160 can accept a large number of data values for various transmission characteristic waveforms, and other forms of probabilistic or imprecise data and combine them to determine whether the present call by the unauthenticated cellular telephone is a valid call using the authorized cellular telephone 4 or an invalid communication using a fraudulent cellular telephone.

The fuzzy logic classifier 160 also includes the sensitivity input 132. In one embodiment, the sensitivity input 132 can alter the threshold at which it generates a high logic level (i.e., a YES vote) at the binary output. As previously discussed, the fuzzy classifier 160 generates a high logic level if the OUT value from equation (3) is greater than or equal to 0.5. However, the sensitivity input 132 can alter the point at which a high logic level is generated. For example, the threshold could be shifted from 0.5 to 0.6 thus resulting in a greater number of NO votes at the binary output 130 of the fuzzy classifier 160. In an alternative embodiment, the sensitivity input 132 is used to scale the data values that are supplied as inputs to the fuzzy logic classifier. As illustrated in FIG. 8, a low number for a data value indicates a better degree of match with a stored reference waveform while a higher number for the data value is indicative of a poor match. This is illustrated in FIG. 8 by the good membership functions 162a and 166a which generally have lower data values for the turn-on transient 50 (see FIG. 3) and the turn-off transient 52, respectively. The operator of the system 100 can increase the sensitivity and therefore cause a greater likelihood of rejection by the fuzzy logic classifier 160. For example, if the sensitivity 132 is set to a value of 1.5, the data value 164 can be scaled by the same factor thus decreasing its membership value in the good membership function 162a and increasing its membership value in the medium membership function 162b and the bad membership function 162c. Thus, an increase in sensitivity scales all data values and results in an increased likelihood of rejection by the fuzzy logic classifier 160.

As discussed above, it is possible to adjust the sensitivity at the sensitivity input 132, and thus the threshold, to compensate for variations in call patterns and historical fraudulent telephone use. For example, certain geographical locations are known to have increased fraudulent activity during certain periods of the day. The sensitivity input 132 can be increased for those portions of the day in those geographical locations to provide a more stringent analysis of the data by the fuzzy logic classifier 160. In contrast, the sensitivity at the sensitivity input 132 can be decreased as appropriate. For example, in geographic locations where fraudulent cellular telephone use is not widespread, the sensitivity value may be decreased so as to lessen the inconvenience to customers of potential rejection of valid cellular telephone calls.

It should be noted that the sensitivity value may be altered on a call-by-call basis. For example, if the dialed digits correspond to a destination in a geographic location, such as a country, to which fraudulent cellular telephone calls are common, the sensitivity may be increased for that particular call. However, for a call to another geographical region to which fraudulent cellular telephone calls are not common, the sensitivity may remain unchanged, or may even be decreased.

The binary output 130 of the fuzzy logic classifier 160 is coupled to the combinatorial logic 128, in the same manner as described above with respect to FIG. 5. In addition, the deterministic analyzer 126 operates in a manner identical to that described above.

Figure 9A:
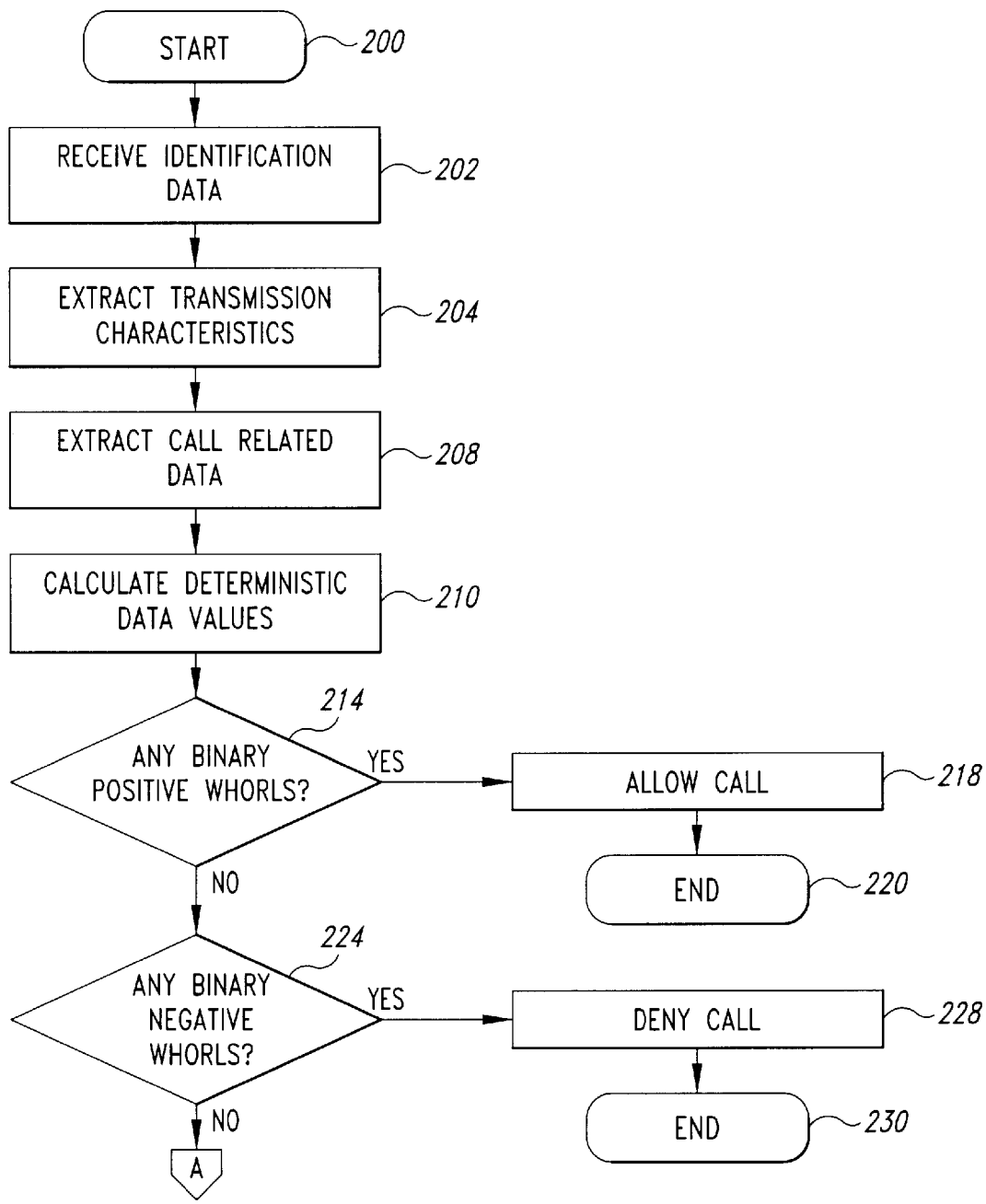
FIGS. 9A and 9B together are a flowchart of the operation of the system of FIG. 4.
Figure 9B:
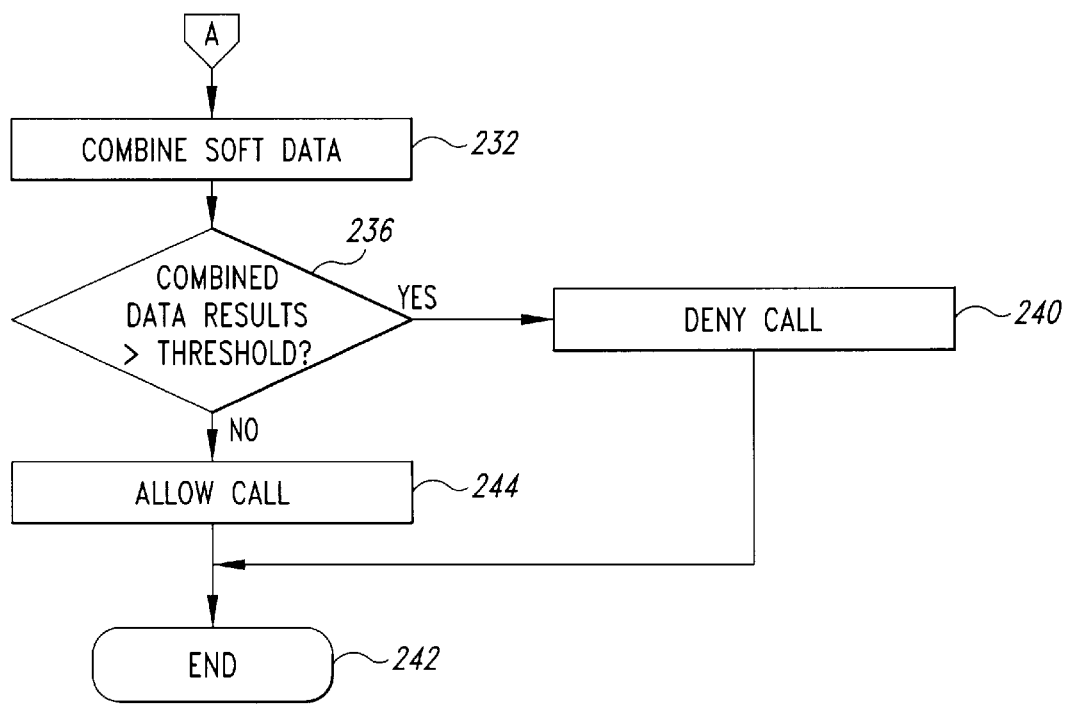

The operation of the system 100 is illustrated in the flow chart of FIGS. 9A and 9B. At a start 200, shown in FIG. 9A, a communication has been established between the unauthenticated cellular telephone and the cell site controller 24 (see FIG. 1). It should be noted that the present communication may be a call from the unauthenticated cell phone to the cell site controller 24 or a call from the cell site controller 24 to the unauthenticated cellular telephone. In step 202, the system 100 receives identification data associated with the unauthenticated cellular telephone. As previously discussed, the unauthenticated cellular telephone transmits its ESN/MIN to the cell site controller. This identification data is used as a pointer by the soft analyzer 124 and the deterministic analyzer 126. For example, the identification data is used by the customer call profile 114 to locate the specific customer call profile associated with that identification data. Similarly, the identification data is used by the signature analyzer 116 to locate the fingerprint reference waveforms associated with that identification data.

In step 204, the system 100 extracts transmission characteristics from the communication between the unauthenticated cellular telephone and the cell site controller 24. As previously discussed, there are a number of different transmission characteristics that can be used by the system 100. In step 208, the system 100 extracts call related data, such as the geographic location of the unauthenticated cellular telephone, the time of the communication with the unauthenticated cellular telephone, and the like. In step 210, the deterministic analyzer 126 calculates deterministic data values to generate YES and/or NO votes on the binary negative whorl control line 136 and the binary positive whorl control line 144. As previously discussed, the deterministic analyzer may combine the various results and generate a single binary negative control whorl 136 and a single binary positive whorl control line 144. Alternatively, the deterministic analyzer 126 may perform a series of separate analyses, with the results of each analysis generating its own binary negative whorl control line 136 or binary positive whorl control line 144.

In decision 214, the system 100 determines whether there are any binary positive whorls (i.e., YES votes) generated by the deterministic analyzer 126. If there are any YES votes generated on the binary positive whorl control line 144, the result of decision 214 is YES. In that event, the system 100 authorizes the cell site controller to allow (i.e., process) the present call, and the system ends the analysis at 220. As previously discussed, any YES votes on the binary positive whorl control line 144 overrides any decision by the soft analyzer 124 or votes cast on the binary negative whorl control line 136 by the deterministic analyzer. Because a YES vote on the binary positive whorl control line 144 overrides the votes of any other part of the decision engine 120, it is unnecessary for the soft analyzer 124 to perform any analysis, since its result is irrelevant. Similarly, it is unnecessary for the deterministic analyzer 126 to analyze deterministic data associated with the binary negative whorl control line 136 since the results of any votes cast on the binary negative whorl control line are also irrelevant.

If there are no YES votes cast on the binary positive whorl control line 144, the result of decision 214 is NO. In that event, the system 100 moves to decision 224, shown in FIG. 9B, where it checks for the presence of any NO votes cast on the binary negative whorl control line 136. If any NO votes have been cast on the binary negative whorl control line 136, the result of decision 224 is YES. In that case, the system 100 casts a NO vote on the system output 122 instructing the cell site controller 24 to deny the present call in step 228, and ends the analysis process at 230. As previously discussed, a NO vote on the binary negative whorl control line 136 overrides any vote by the soft analyzer 124. If any NO vote has been cast on the binary negative whorl control line 136, it is unnecessary for the soft analyzer 124 to perform any data analysis since its results are irrelevant.

If the deterministic analyzer 126 has not cast any NO votes on the binary negative whorl control line 136, the result of decision 224 is NO. In that event, the soft analyzer 124 combines the results of the various soft data inputs and confidence values in step 232. As previously discussed, the soft analyzer 124 may combine the soft data itself, or use the fuzzy logic classifier 160 (see FIG. 7) to combine the soft data. In decision 236, the soft analyzer 124 determines whether the combined data results exceed the threshold set on the sensitivity input 132. As previously discussed, the fuzzy logic classifier 160 (see FIG. 7) uses the sensitivity input 132 to scale the values of the feature vectors. As can be appreciated by those skilled in the art, scaling data values effectively alters the threshold.

If the combined data results do not exceed the threshold, the result of decision 236 is NO. In that event, the soft analyzer 124 casts a NO vote on the binary output 130. As previously discussed, the result of a NO vote on the binary output 130 is used by the combinatorial logic circuit 128 to generate a NO vote as the system output 122. As a result of the NO vote on the system output 122, the cell site controller will deny (i.e., not process) the present call in step 240 and ends the analysis process at 242. In contrast, if the combined data results do exceed the threshold, the result of decision 236 is YES. In that event, the soft analyzer casts a YES vote on the binary output 130 resulting in a YES vote on the system output 122. As a result of the YES vote at the system output 122, the cell site controller 24 will allow (i.e., process) the present call in step 244 and end the analysis process at 242. Thus, the system 100 efficiently combines soft data and deterministic data to classify calls as valid or invalid. It should be noted that this analysis occurs in real time thus effectively preventing fraudulent calls from being processed by the cell site controller 24. The system 100 effectively denies calls from fraudulent cellular telephones such that customers are not erroneously billed for such invalid calls. Furthermore, the system 100 avoids drastic fraudulent prevention measures, such as the elimination of roaming within designated geographical areas.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the authorization of a present telephone communication with a wireless telephone in a wireless telephone system, the authorization system comprising:

a signature analyzer to classify an unauthenticated wireless telephone as an authorized wireless telephone or a fraudulent wireless telephone based on analysis of a transmission characteristic of the unauthenticated wireless telephone detected during the present communication with the unauthenticated wireless telephone, the signature analyzer calculating a first data value indicative of a similarity with which the transmission characteristic of the unauthenticated wireless telephone matches a stored reference characteristic, and a first confidence value indicative of a measure of reliability of the first calculated data value;

a soft analyzer receiving and analyzing the first calculated data value and first confidence value from the signature analyzer to determine a likelihood that the present communication is a valid communication with the authorized wireless telephone or an invalid communication with the fraudulent wireless telephone, the soft analyzer generating a first authorization signal having a first binary level if the analysis determines that the present communication is the valid communication and a second binary level different from the first binary level if the analysis determines that the present communication is the invalid communication;

a deterministic analyzer analyzing the present communication in a deterministic fashion to determine if the present communication with the unauthenticated wireless telephone is the valid communication or the invalid communication, the deterministic analyzer generating a second authorization signal at a third binary level if the deterministic analyzer determines that the present communication is the valid communication and a fourth binary level different from the third binary level if the deterministic analyzer determines that the present communication is the invalid communication, the soft analyzer analyzing the first calculated data value and the first confidence value independently of the analysis by the deterministic analyzer; and a combinatorial logic unit to combine the first and second authorization signals and generate an output signal at a fifth binary level to authorize the present communication only if the first and second authorization signals are both at the first and third binary levels, respectively, and generating the output signal at a sixth binary level different from the fifth binary level if either of the first and second authorization signals is at the second and fourth binary levels, respectively, to cause termination of the present communication as the invalid communication, the logic unit generating the output signal at the sixth binary level to cause termination of the present communication as the invalid communication regardless of the analysis by the soft analyzer if the deterministic analyzer determines that the present communication is the invalid communication.

2. The system of claim 1 wherein the first confidence value is used as a weighting factor for the calculated first data value.

3. The system of claim 1 wherein the signature analyzer analyzes a plurality of different transmission characteristics of the unauthenticated wireless telephone detected during the present communication with the unauthenticated wireless telephone and calculates a plurality of respective data values indicative of the similarity with which each of the plurality of transmission characteristics match a plurality of corresponding stored reference characteristics, and a plurality of confidence values indicative of a measure of reliability of each of the plurality of calculated data values, the soft analyzer using the plurality of calculated data values and the plurality of confidence values to generate the first authorization signal.

4. The system of claim 1 wherein the soft analyzer generates the first authorization signal at the first binary level if the analysis determines that the present communication is the valid communication with a probability exceeding a predetermined probability threshold.

5. The system of claim 4 wherein the soft analyzer further includes an adjustable sensitivity control adjustable to selectively alter the predetermined probability threshold.

6. The system of claim 4 wherein said soft analyzer scales said first calculated value to alter the sensitivity of the soft analyzer.

7. The system of claim 1 wherein the deterministic analyzer always generates the second authorization signal at the third binary level unless the deterministic analyzer determines that the present communication is the invalid communication with the fraudulent wireless telephone.

8. The system of claim 7 wherein the present communication with the unauthenticated wireless telephone includes a plurality of dialed digits indicative of an intended destination telephone number, the system further including a data storage area containing a list of known fraudulent destination telephone numbers and wherein the deterministic analyzer generates the second authorization at the signal fourth binary level whenever the deterministic analyzer determines that the dialed digits of the present communication matches one of the known fraudulent destination telephone numbers.

9. The system of claim 1 wherein the deterministic analyzer generates a third authorization signal at a seventh binary level if the deterministic analyzer determines that the present communication should be processed regardless of the first and second authorization signals, the combinatorial logic unit combining the first, second, and third authorization signals and generating the output signal at the fifth binary level regardless of the first and second authorization signals if the third authorization signal is at the seventh binary level and generating the output signal at the sixth binary level if the third authorization signal is at an eighth binary level different from the seventh binary level and one of the first and second output signals are at the second and fourth binary levels, respectively.

10. A system for the authorization of a present telephone communication with an unauthenticated wireless telephone in a wireless telephone system based on soft data generated by analysis of characteristics of the unauthenticated wireless telephone with respect to stored characteristics associated with an authorized wireless telephone and based on deterministic data generated by analysis of characteristics of the present communication, the authorization system comprising:

a soft analyzer to receive and analyze the soft data to determine a likelihood that the present communication is a valid communication with the authorized wireless telephone or an invalid communication with a fraudulent wireless telephone, the soft analyzer generating a first authorization signal at a first binary level if the analysis determines that the present communication is the valid communication and at a second binary level different from the first binary level if the analysis determines that the present communication is the invalid communication;

a deterministic analyzer to receive and analyze the deterministic data to determine if the present communication with the unauthenticated wireless telephone is the valid communication or the invalid communication, the deterministic analyzer generating a second authorization signal at a third binary level if the deterministic analyzer determines that the present communication is the valid communication and a fourth binary level different from the third binary level if the deterministic analyzer determines that the present communication is the invalid communication, the soft analyzer analyzing the soft data independently of the analysis by the deterministic analyzer; and a combinatorial logic unit to combine the first and second authorization signals and generate an output signal at a fifth binary level to authorize the present communication only if the first and second authorization signals are both at the first and third binary levels, respectively, and generating the output signal at a sixth binary level different from the fifth binary level if either of the first and second authorization signals is at the second and fourth binary levels, respectively, to cause termination of the present communication as the invalid communication, the logic unit generating the output signal at the sixth binary level to cause termination of the present communication as the invalid communication regardless of the analysis by the soft analyzer if the deterministic analyzer determines that the present communication is the invalid communication.

11. The system of claim 10, further including a signature analyzer to generate the soft data by classifying the unauthenticated wireless telephone as the authorized wireless telephone or the fraudulent wireless telephone based on analysis of a transmission characteristic of the unauthenticated wireless telephone detected during the present communication with the unauthenticated wireless telephone, the signature analyzer calculating a first data value indicative of a statistical likelihood with which the transmission characteristic of the unauthenticated wireless telephone matches a stored reference characteristic, the soft analyzer generating the first authorization signal based at least in part on the first data value.

12. The system of claim 11 wherein the signature analyzer analyzes a plurality of different transmission characteristics of the unauthenticated wireless telephone in the present communication with the unauthenticated wireless telephone and calculates a plurality of data values indicative of the degree to which each of the plurality of transmission characteristics match a plurality of corresponding stored reference characteristics, respectively, the soft analyzer using the calculated first data value and the calculated plurality of data values to generate the first authorization signal.

13. The system of claim 12 wherein the signature analyzer also calculates a first confidence value indicative of a statistical measure of reliability of the first data value and a plurality of confidence values indicative of a statistical measure of reliability of each of the plurality of data values, the soft analyzer using the first confidence value and the plurality of confidence values as weighting factors for the calculated first data value, and the calculated plurality of data values, respectively.

14. The system of claim 10 wherein the soft analyzer generates the first authorization signal at the first binary level if the analysis determines that the present communication is the valid communication with a probability exceeding a predetermined probability threshold.

15. The system of claim 14 wherein the soft analyzer further includes an adjustable sensitivity control adjustable to selectively alter the predetermined probability threshold.

16. The system of claim 14 wherein said soft analyzer scales said first calculated value to alter the sensitivity of the soft analyzer.

17. The system of claim 10 wherein the deterministic analyzer always generates the second authorization signal at the third binary level unless the deterministic analyzer determines that the present communication is the invalid communication with the fraudulent wireless telephone.

18. The system of claim 17 wherein the present communication with the unauthenticated wireless telephone includes a plurality of dialed digits indicative of an intended destination telephone number, the system further including a data storage area containing a list of known fraudulent destination telephone numbers as the deterministic data and the deterministic analyzer generates the second authorization signal at the fourth binary level whenever the deterministic analyzer determines that the dialed digits of the present communication matches one of the known fraudulent destination telephone numbers.

19. The system of claim 10 wherein the deterministic analyzer generates a third authorization signal at a seventh binary level if the deterministic analyzer determines that the present communication should be processed regardless of the first and second authorization signals, the combinatorial logic unit combining the first, second, and third authorization signals and generating the output signal at the fifth binary level regardless of the first and second authorization signals if the third authorization signal is at the seventh binary level and generating the output signal at the sixth binary level if the third authorization signal is at an eighth binary level different from the seventh binary level and one of the first and second output signals are at the second and fourth binary levels, respectively.

20. A system for the authorization of a present telephone communication with a wireless telephone in a wireless telephone system, the authorization system comprising:

a signature analyzer to classify an unauthenticated wireless telephone as an authorized wireless telephone or a fraudulent wireless telephone based on analysis of a transmission characteristic of the unauthenticated wireless telephone detected during the present communication with the unauthenticated wireless telephone, the signature analyzer calculating a first data value indicative of a similarity with which the transmission characteristic of the unauthenticated wireless telephone matches a stored reference characteristic, and a first confidence value indicative of a measure of reliability of the first calculated data value;

a fuzzy logic classifier receiving and analyzing the first calculated data value and first confidence value from the signature analyzer to determine a likelihood that the present communication is a valid communication with the authorized wireless telephone or an invalid communication with the fraudulent wireless telephone, the fuzzy logic classifier generating a first authorization signal having a first binary level if the analysis determines that the present communication is the valid communication and a second binary level different from the first binary level if the analysis determines that the present communication is the invalid communication;

a deterministic analyzer analyzing the present communication in a deterministic fashion to determine if the present communication with the unauthenticated wireless telephone is the valid communication or the invalid communication, the deterministic analyzer generating a second authorization signal at a third binary level if the deterministic analyzer determines that the present communication is the valid communication and a fourth binary level different from the third binary level if the deterministic analyzer determines that the present communication is the invalid communication, the fuzzy logic classifier analyzing the first calculated data value and the first confidence value independently of the analysis by the deterministic analyzer; and a combinatorial logic unit to combine the first and second authorization signals and generate an output signal at a fifth binary level to authorize the present communication only if the first and second authorization signals are both at the first and third binary levels, respectively, and generating the output signal at a sixth binary level different from the fifth binary level if either of the first and second authorization signals is at the second and fourth binary levels, respectively, to cause termination of the present communication as the invalid communication, the logic unit generating the output signal at the sixth binary level to cause termination of the present communication as the invalid communication regardless of the analysis by the fuzzy logic classifier if the deterministic analyzer determines that the present communication is the invalid communication.

21. A system for the authorization of a present telephone communication with an unauthenticated wireless telephone in a wireless telephone system based on soft data generated by analysis of characteristics of the unauthenticated wireless telephone with respect to stored characteristics associated with an authorized wireless telephone and based on deterministic data generated by analysis of characteristics of the present communication, the authorization system comprising:

a fuzzy logic classifier to receive and analyze the soft data to determine a likelihood that the present communication is a valid communication with the authorized wireless telephone or an invalid communication with a fraudulent wireless telephone, the fuzzy logic classifier generating a first authorization signal at a first binary level if the analysis determines that the present communication is the valid communication and at a second binary level different from the first binary level if the analysis determines that the present communication is the invalid communication;

a deterministic analyzer to receive and analyze the deterministic data to determine if the present communication with the unauthenticated wireless telephone is the valid communication or the invalid communication, the deterministic analyzer generating a second authorization signal at a third binary level if the deterministic analyzer determines that the present communication is the valid communication and a fourth binary level different from the third binary level if the deterministic analyzer determines that the present communication is the invalid communication, the fizzy logic classifier analyzing the soft data independently of the analysis by the deterministic analyzer; and a combinatorial logic unit to combine the first and second authorization signals and generate an output signal at a fifth binary level to authorize the present communication only if the first and second authorization signals are both at the first and third binary levels, respectively, and generating the output signal at a sixth binary level different from the fifth binary level if either of the first and second authorization signals is at the second and fourth binary levels, respectively, to cause termination of the present communication as the invalid communication, the logic unit generating the output signal at the sixth binary level to cause termination of the present communication as the invalid communication regardless of the analysis by the fuzzy logic classifier if the deterministic analyzer determines that the present communication is the invalid communication.

22. The system of claim 21, further including a signature analyzer to generate the soft data by classifying the unauthenticated wireless telephone as the authorized wireless telephone or the fraudulent wireless telephone based on analysis of a transmission characteristic of the unauthenticated wireless telephone detected during the present communication with the unauthenticated wireless telephone, the signature analyzer calculating a first data value indicative of a similarity with which the transmission characteristic of the unauthenticated wireless telephone matches a stored reference characteristic, the fuzzy logic classifier generating the first authorization signal based at least in part on the first data value.

23. The system of claim 22 wherein the signature analyzer analyzes a plurality of different transmission characteristics of the unauthenticated wireless telephone in the present communication with the unauthenticated wireless telephone and calculates a plurality of data values indicative of the degree to which each of the plurality of transmission characteristics match a plurality of corresponding stored reference characteristics, respectively, the fuzzy logic classifier using the calculated first data value and the calculated plurality of data values to generate the first authorization signal.

24. The system of claim 23 wherein the signature analyzer also calculates a first confidence value indicative of a measure of reliability of the first calculated data value and a plurality of confidence values indicative of a measure of reliability of each of the respective calculated plurality of data values, the fuzzy logic classifier using the first confidence value and the plurality of respective confidence values as additional data values and generating the first authorization signal using the first calculated data value, the plurality of calculated data values, the calculated first confidence value and the plurality of respective calculated confidence values.

25. The system of claim 21 wherein the fuzzy logic classifier generates the first authorization signal at the first binary level if the fuzzy logic classifier determines that the present communication is the valid communication with a likelihood exceeding a predetermined threshold.

26. The system of claim 25 wherein the fuzzy logic classifier further includes an adjustable sensitivity control adjustable to selectively alter the predetermined probability threshold.

27. The system of claim 21 wherein the deterministic analyzer always generates the second authorization signal at the third binary level unless the deterministic analyzer determines that the present communication is the invalid communication with the fraudulent wireless telephone.

28. The system of claim 21 wherein the deterministic analyzer generates a third authorization signal at a seventh binary level if the deterministic analyzer determines that the present communication should be processed regardless of the first and second authorization signals, the combinatorial logic unit combining the first, second, and third authorization signals and generating the output signal at the fifth binary level regardless of the first and second authorization signals if the third authorization signal is at the seventh binary level and generating the output signal at the sixth binary level if the third authorization signal is at an eighth binary level different from the seventh binary level and one of the first and second output signals are at the second and fourth binary levels, respectively.

29. A system for the authorization of a present telephone communication with an unauthenticated wireless telephone in a wireless telephone system based on soft data generated by analysis of characteristics of the unauthenticated wireless telephone with respect to stored characteristics associated with an authorized wireless telephone and based on deterministic data generated by analysis of characteristics of the present communication, the authorization system comprising:

a first analyzer to receive and analyze the soft data to determine a likelihood that the present communication is a valid communication with the authorized wireless telephone or an invalid communication with a fraudulent wireless telephone, the first analyzer generating a first authorization signal at a first binary level if the first analyzer determines that the present communication is the valid communication and at a second binary level different from the first binary level if the first analyzer determines that the present communication is the invalid communication;

a second analyzer to receive and analyze the deterministic data to determine if the present communication with the unauthenticated wireless telephone is the valid communication or the invalid communication, the second analyzer generating a second authorization signal at a third binary level if the second analyzer determines that the present communication is the valid communication and a fourth binary level different from the third binary level if the second analyzer determines that the present communication is the invalid communication, the first analyzer analyzing the soft data independently of the analysis by the second analyzer; and a combinatorial logic unit to combine the first and second authorization signals and generate an output signal at a fifth binary level to authorize the present communication only if the first and second authorization signals are both at the first and third binary levels, respectively, and generating the output signal at a sixth binary level different from the fifth binary level if either of the first and second authorization signals is at the second and fourth binary levels, respectively, to cause termination of the present communication as the invalid communication, the logic unit generating the output signal at the sixth binary level to cause termination of the present communication as the invalid communication regardless of the analysis by the first analyzer if the second analyzer determines that the present communication is the invalid communication.

30. The system of claim 29 wherein the first analyzer is a soft analyzer that combines the data generated by the analysis of characteristics of the telephone communication and the unauthenticated wireless telephone with respect to stored characteristics associated with the authorized wireless telephone, the soft analyzer calculating a likelihood that the present communication is the valid communication and generating the first authorization signal at the first binary level if the analysis determines that the present communication is the valid communication.

31. The system of claim 29 wherein the first analyzer is a neural network analyzer that combines the soft data generated by the analysis of characteristics of the telephone communication and the unauthenticated wireless telephone with respect to stored characteristics associated with the authorized wireless telephone, the neural network analyzer calculating a likelihood that the present communication is the valid communication and generating the first authorization signal at the first binary level if the neural network analyzer determines that the present communication is the valid communication.

32. The system of claim 29 wherein the first analyzer is a fuzzy logic classifier that combines the soft data generated by the analysis of characteristics of the telephone communication and the unauthenticated wireless telephone with respect to stored characteristics associated with the authorized wireless telephone, the fuzzy logic classifier calculating a likelihood that the present communication is the valid communication and generating the first authorization signal at the first binary level if the fuzzy logic classifier determines that the present communication is the valid communication.

33. A method for the authorization of a present telephone communication with an unauthenticated wireless telephone in a wireless telephone system based on soft data generated by analysis of characteristics of the unauthenticated wireless telephone with respect to stored characteristics associated with an authorized wireless telephone and based on deterministic data generated by analysis of characteristics of the present communication, the authorization method comprising the steps of:

analyzing the soft data to determine a likelihood that the present communication is a valid communication with the authorized wireless telephone or an invalid communication with a fraudulent wireless telephone;

generating a first authorization signal at a first binary level if the step of analyzing the soft data determines that the present communication is the valid communication and at a second binary level different from the first binary level if the step of analyzing the soft data determines that the present communication is the invalid communication;

analyzing the deterministic data to determine if the present communication with the unauthenticated wireless telephone is the valid communication or the invalid communication;

generating a second authorization signal at a third binary level if the step of analyzing the deterministic data determines that the present communication is the valid communication and at a fourth binary level different from the third binary level if the step of analyzing the deterministic data determines that the present communication is the invalid communication, wherein the steps of analyzing the soft data and generating the first authorization signal occur independently of the steps of analyzing the deterministic data and generating the second authorization signal; and combining the first and second authorization signals to generate an output signal at a fifth binary level to authorize the present communication only if the first and second authorization signals are both at the first and third binary levels, respectively, and to generate the output signal at a sixth binary level different from the fifth binary level if either of the first and second authorization signals is at the second and fourth binary levels, respectively, to cause termination of the present communication as the invalid communication, wherein the step of combining to generate the output signal at the sixth binary level occurs regardless of the binary level of the first authorization signal if the step of analyzing the deterministic data determines that the present communication is the invalid communication.

34. The method of claim 33 wherein the step of analyzing the soft data is performed by a soft analyzer that performs the steps of combining the soft data generated by the analysis of characteristics of the telephone communication and the unauthenticated wireless telephone with respect to stored characteristics associated with the authorized wireless telephone, and calculating a likelihood that the present communication is the valid communication and generating the first authorization signal at the first binary level if the analysis determines that the present communication is the valid communication.

35. The method of claim 33 wherein the step of analyzing the soft data is performed by a neural network analyzer that performs the steps of combining the soft data generated by the analysis of characteristics of the telephone communication and the unauthenticated wireless telephone with respect to stored characteristics associated with the authorized wireless telephone, and calculating a likelihood that the present communication is the valid communication and generating the first authorization signal at the first binary level if the neural network analyzer determines that the present communication is the valid communication.

36. The method of claim 33 wherein the step of analyzing the soft data is performed by a fuzzy logic classifier that performs the steps of combining the soft data generated by the analysis of characteristics of the telephone communication and the unauthenticated wireless telephone with respect to stored characteristics associated with the authorized wireless telephone, the fuzzy logic classifier applying a set of relational rules to calculate a likelihood that the present communication is the valid communication and generating the first authorization signal at the first binary level if the fuzzy logic classifier determines that the present communication is the valid communication.

37. The method of claim 33, further including the step of generating the soft data by classifying the unauthenticated wireless telephone as the authorized wireless telephone or the fraudulent wireless telephone based on an analysis of a transmission characteristic of the unauthenticated wireless telephone detected during the present communication with the unauthenticated wireless telephone, the transmission characteristic analysis calculating a first data value indicative of a similarity with which the transmission characteristic of the unauthenticated wireless telephone matches a stored reference characteristic, the step of generating the first authorization signal generating the first authorization signal based at least in part on the first data value.

38. The method of claim 37 wherein the step of generating the soft data analyzes a plurality of different transmission characteristics of the unauthenticated wireless telephone in the present communication with the unauthenticated wireless telephone and calculates a plurality of data values indicative of the similarity with which each of the plurality of transmission characteristics matches a plurality of corresponding stored reference characteristics, respectively, the step of generating the first authorization signal based at least in part on the calculated first data value and the calculated plurality of data values.

39. The method of claim 38 wherein the step of generating the soft data also calculates a first confidence value indicative of a measure of reliability of the first data value and a plurality of confidence values indicative of a measure of reliability of each of the plurality of data values, the step of analyzing the probabilistic data using the first confidence value and the plurality of confidence values as weighting factors for the calculated first data value, and the calculated plurality of data values, respectively.

40. The method of claim 33 wherein the step of generating the first authorization signal generates the first authorization signal at the first binary level if the step of analyzing the soft data determines that the present communication is the valid communication with a probability exceeding a predetermined probability threshold.

41. The method of claim 40, further including the step of altering an adjustable sensitivity control adjustable to selectively alter the predetermined probability threshold.

42. The method of claim 33 wherein the step of generating the second authorization signal always generates the second authorization signal at the third binary level unless the step of analyzing the deterministic data determines that the present communication is the invalid communication with the fraudulent wireless telephone.

43. The method of claim 33, further including the step of generating a third authorization signal at a seventh binary level if the step of analyzing the deterministic data determines that the present communication should be processed regardless of the first and second authorization signals, the step of combining authorization signals combining the first, second, and third authorization signals and generating the output signal at the fifth binary level regardless of the first and second authorization signals if the third authorization signal is at the seventh binary level and generating the output signal at the sixth binary level if the third authorization signal is at an eighth binary level different from the seventh binary level and one of the first and second output signals are at the second and fourth binary levels, respectively.

* * * * *